United States Patent
Yamaoka et al.

(10) Patent No.: US 9,852,358 B2
(45) Date of Patent: Dec. 26, 2017

(54) INFORMATION PROCESSING DEVICE, INFORMATION PROCESSING METHOD, AND INFORMATION PROCESSING SYSTEM

(71) Applicant: SONY CORPORATION, Minato-ku (JP)

(72) Inventors: Keisuke Yamaoka, Tokyo (JP); Toshinori Ihara, Tokyo (JP); Goh Kobayashi, Tokyo (JP); Takuro Kawai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 51 days.

(21) Appl. No.: 14/379,923

(22) PCT Filed: Mar. 21, 2013

(86) PCT No.: PCT/JP2013/001912
§ 371 (c)(1),
(2) Date: Aug. 20, 2014

(87) PCT Pub. No.: WO2013/145654
PCT Pub. Date: Oct. 3, 2013

(65) Prior Publication Data
US 2015/0035827 A1 Feb. 5, 2015

(30) Foreign Application Priority Data

Mar. 29, 2012 (JP) ................. 2012-076221

(51) Int. Cl.
*G06K 9/62* (2006.01)
*G09B 19/00* (2006.01)
*G06T 17/00* (2006.01)

(52) U.S. Cl.
CPC ............ *G06K 9/6215* (2013.01); *G06T 17/00* (2013.01); *G09B 19/0038* (2013.01)

(58) Field of Classification Search
CPC ............ G06K 9/6215; G06K 9/00362; G06K 9/00355; A61B 5/1116; G06F 3/017; G06T 7/2046; G06T 13/20; G06T 17/00; G06T 19/006; G06T 2207/10016
See application file for complete search history.

(56) References Cited

U.S. PATENT DOCUMENTS

| 6,557,010 B1* | 4/2003 | Kim .................. G06F 17/30271 |
| 2002/0178135 A1* | 11/2002 | Tanaka .............. G06F 17/30247 |
| 2006/0202986 A1* | 9/2006 | Okada ................ G06F 17/5009 345/419 |

(Continued)

FOREIGN PATENT DOCUMENTS

JP 2012-9957 A 1/2012

OTHER PUBLICATIONS

Reale, Michael J., et al. "A multi-gesture interaction system using a 3-D iris disk model for gaze estimation and an active appearance model for 3-D hand pointing." IEEE Transactions on Multimedia 13.3 (2011): 474-486.*

*Primary Examiner* — Sultana M Zalalee

(57) ABSTRACT

An information processing apparatus includes processing circuitry (similarity calculation section) configured to calculate a similarity between a posture model and posture data, wherein the posture model being indicative of a posture in a time series gesture, and the posture data being indicative of a posture in a time series of a subject in moving image data.

17 Claims, 19 Drawing Sheets

(56) References Cited

U.S. PATENT DOCUMENTS

| | | | |
|---|---|---|---|
| 2006/0251328 A1* | 11/2006 | Boo | G06K 9/00711 |
| | | | 382/220 |
| 2008/0052643 A1* | 2/2008 | Ike | G06F 3/017 |
| | | | 715/863 |
| 2009/0298650 A1* | 12/2009 | Kutliroff | A63B 71/0622 |
| | | | 482/8 |
| 2010/0156936 A1* | 6/2010 | Maeda | G06F 17/30259 |
| | | | 345/647 |
| 2010/0188519 A1* | 7/2010 | Yamaoka | G06K 9/00369 |
| | | | 348/222.1 |
| 2012/0154606 A1* | 6/2012 | Ye | H04L 67/2804 |
| | | | 348/207.1 |
| 2012/0206577 A1* | 8/2012 | Guckenberger | G06T 11/00 |
| | | | 348/47 |
| 2013/0225305 A1* | 8/2013 | Yang | A63F 13/00 |
| | | | 473/152 |

* cited by examiner

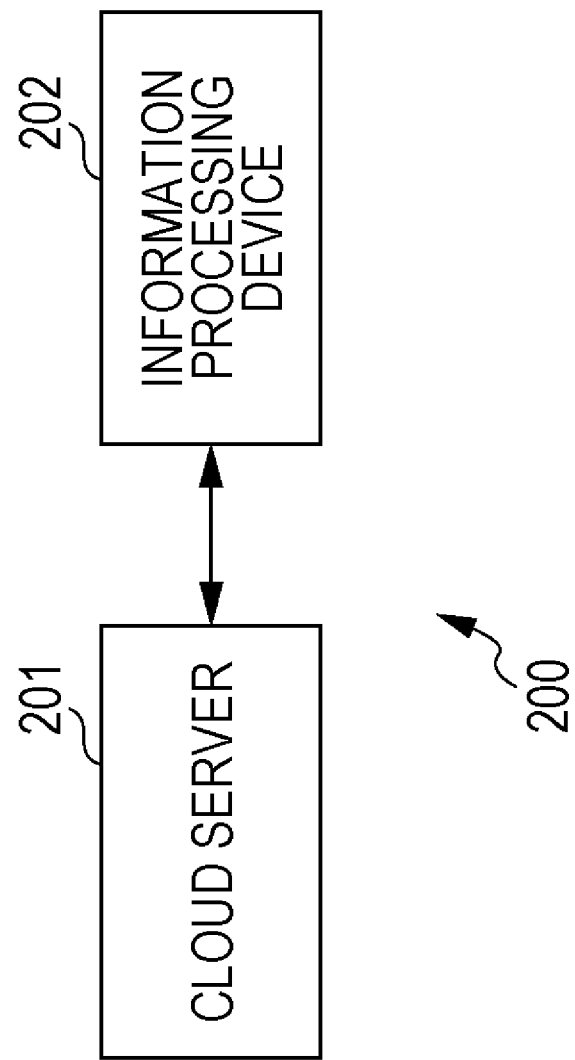

INFORMATION PROCESSING DEVICE, INFORMATION PROCESSING METHOD, AND INFORMATION PROCESSING SYSTEM

TECHNICAL FIELD

The present technology relates to an information processing device, an information processing method, and an information processing system, and particularly to an information processing device, an information processing method, and an information processing system that enables presentation of the similarity between a gesture that serves as a model and a gesture of a subject as moving image data to a user.

BACKGROUND ART

In recent years, various kinds of technologies for analyzing images have been researched and developed. For example, a technology of analyzing the facial expression of a viewer in an image and generating response information indicating the response of the viewer has been developed (refer particularly to Patent Literature 1).

On the other hand, recently, since the environment has been made in which general users can easily create moving image data, a large quantity of moving image data is being created. Thus, it is required to provide a useful application using such moving image data for the users.

CITATION LIST

Patent Literature

PTL 1: Japanese Unexamined Patent Application Publication No. 2012-9957

SUMMARY OF INVENTION

Technical Problem

An information processing apparatus includes
processing circuitry configured to calculate a similarity between a posture model and posture data, wherein
the posture model being indicative of a posture in a time series gesture, and
the posture data being indicative of a posture in a time series of a subject in moving image data.

Advantageous Effects of Invention

According to the present technology, it is possible to present the similarity between a gesture that serves as a model and a gesture of a subject as moving image data to a user.

BRIEF DESCRIPTION OF DRAWINGS

FIG. 19 is a block diagram illustrating a configuration example of a second embodiment of the information processing system to which the present technology is applied.

DESCRIPTION OF EMBODIMENTS

<First Embodiment>
<Configuration Example of First Embodiment of Information Processing Device>

Figure 1:
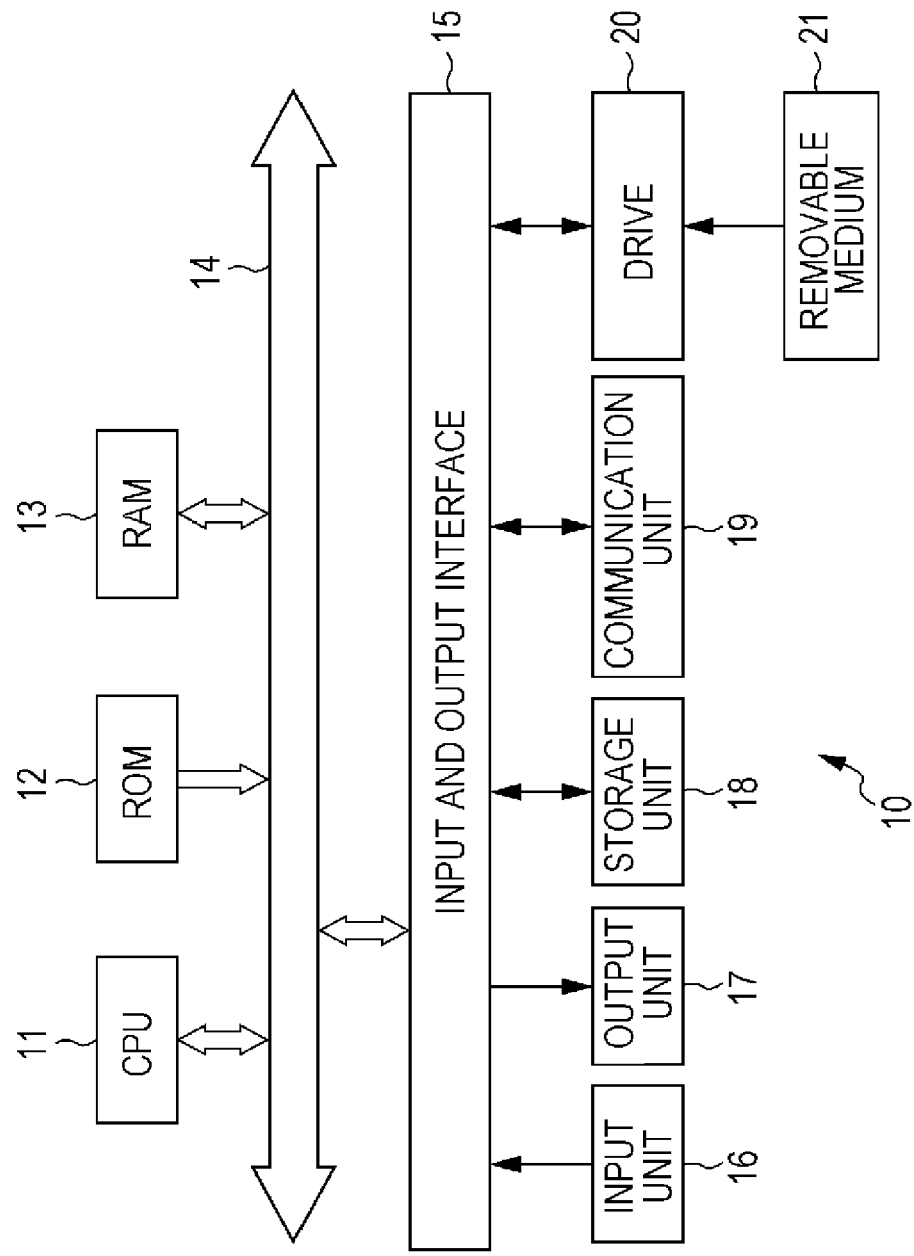
FIG. 1 is a block diagram illustrating a configuration example of hardware of a first embodiment of an information processing device to which the present technology is applied.

FIG. 1 is a block diagram illustrating a configuration example of hardware of a first embodiment of an information processing device to which the present technology is applied.

In the information processing device 10 of FIG. 1, a CPU (Central Processing Unit) 11, a ROM (Read Only Memory) 12, and a RAM (Random Access Memory) 13 are connected to one another via a bus 14.

To the bus 14, an input and output interface 15 is further connected. To the input and output interface 15, an input unit 16, an output unit 17, a storage unit 18, a communication unit 19, and a drive 20 are connected.

The input unit 16 includes a keyboard, a mouse, a microphone, and the like. The output unit 17 includes a display, a speaker, and the like. The storage unit 18 includes a hard disk, a non-volatile memory, and the like. The communication unit 19 includes a network interface, and the like. The drive 20 drives a removable medium 21 such as a magnetic disk, an optical disc, a magneto-optical disc, or a semiconductor memory.

In the information processing device 10 configured as above, various processes are performed in such a way that the CPU 11 loads, for example, a program stored in the storage unit 18 on the RAM 13 via the input and output interface 15 and the bus 14 and executes the program.

In the information processing device 10, for example, a model generation process is performed in which a posture model indicating a posture in a time series in a gesture that serves as a model is generated. In addition, in the information processing device 10, a similarity calculation process is performed in which the similarity between the posture model and target posture data that is posture data indicating the posture of a subject in a time series as moving image data to be processes is calculated. In other words, the CPU 11 functions as a model generation processing unit that performs the model generation process or as a similarity calculation processing unit that performs the similarity calculation process.

A program that the CPU 11 executes can be provided by being recorded on, for example, the removable medium 21 as a package medium, or the like. In addition, such a program can be provided through a wired or a wireless transmission medium such as a local area network, the Internet, or digital satellite broadcasting.

In the information processing device 10, such a program can be installed in the storage unit 18 via the input and output interface 15 by loading the removable medium 21 on the drive 20. Further, the program can be received in the communication unit 19 via a wired or a wireless transmission medium and then installed in the storage unit 18. In addition to that, the program can be installed in advance in the ROM 12 or the storage unit 18.

<Configuration Example of Model Generation Processing Unit>

Figure 2:
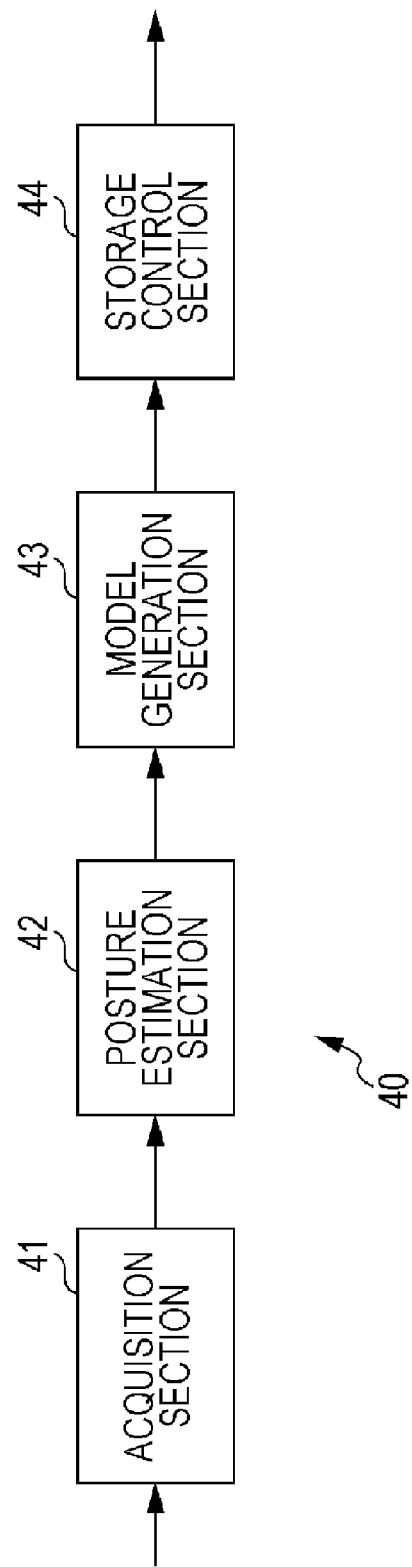
FIG. 2 is a block diagram illustrating a configuration example of a model generation processing unit.

FIG. 2 is a block diagram illustrating a configuration example of a model generation processing unit.

The model generation processing unit 40 of FIG. 2 is constituted by an acquisition section 41, a posture estimation section 42, a model generation section 43, and a storage control section 44.

Note that, hereinbelow, the case in which the model generation processing unit 40 generates one posture model will be described, however, when a plurality of posture models are generated, the same process as that performed when one posture model is generated will be performed for each gesture that serves as a model.

The acquisition section 41 of the model generation processing unit 40 reads a plurality of moving image data pieces of a subject that makes a gesture that serves as a model (hereinafter, referred to as model moving image data) from the storage unit 18, or acquires the data pieces from an external server, or the like, via the communication unit 19. Note that the gesture that serves as a model may be decided in advance, or may be set by an operation of the input unit 16 by a user. The acquisition section 41 supplies a plurality of model moving image data pieces to the posture estimation section 42.

The posture estimation section 42 extracts feature amounts of a posture of the subject from each of the plurality of model moving image data pieces in a frame unit, and generates posture data using the feature amounts.

Specifically, for example, the posture estimation section 42 extracts the locations of eight joints of the upper half of a body from the model moving image data of a frame unit as feature amounts using a technique of obtaining mapping between SIFT feature amounts and the three-dimensional coordinates of human joints using ridge regression. This technique is disclosed in "A Local Basis Representation for Estimating Human Pose from Cluttered Images" by Ankur Agarwal, Bill Triggs for 2006 ACCV (Asian Conference on Computer Vision), or the like.

Note that the posture estimation section 42 may set the extracted feature amounts to be those that will be unchanged with the camera angle during photographing, by converting the extracted feature amounts into, for example, a polar coordinate system having the coordinates of the neck as the center. In addition, the posture estimation section 42 may perform vector normalization for the extracted feature amounts and set the feature amounts to be those that will be unchanged with the size of the subject. Further, the posture estimation section 42 may convert the extracted feature amounts into, for example, a polar coordinate system having the coordinates of the neck as the center and performing vector normalization for the feature amounts so as to be set as feature amounts that will be unchanged with the camera angle during photographing and the size of the subject. The posture estimation section 42 sets time-series data of the feature amounts of a frame unit to be posture data.

The posture estimation section 42 supplies posture data of each of the plurality of model moving image data pieces to the model generation section 43.

The model generation section 43 models the posture in a time series in the gesture that serves as a model based on the HMM (Hidden Markov Model), or the like using the posture data of the plurality of model moving image data pieces supplied from the posture estimation section 42. The HMM is a technique of stochastically modeling time-series data as a combination of a plurality of states, and is suitable for modeling time-series data having temporal extension and contraction even if the time-series data is of the same model, just as the posture data. The model generation section 43 supplies a posture model generated by the modeling to the storage control section 44.

The storage control section 44 supplies the posture model supplied from the model generation section 43 to the storage unit 18 of FIG. 1 and causes the storage unit to store the model.

<Description of Generation of Posture Model>

Figure 3:
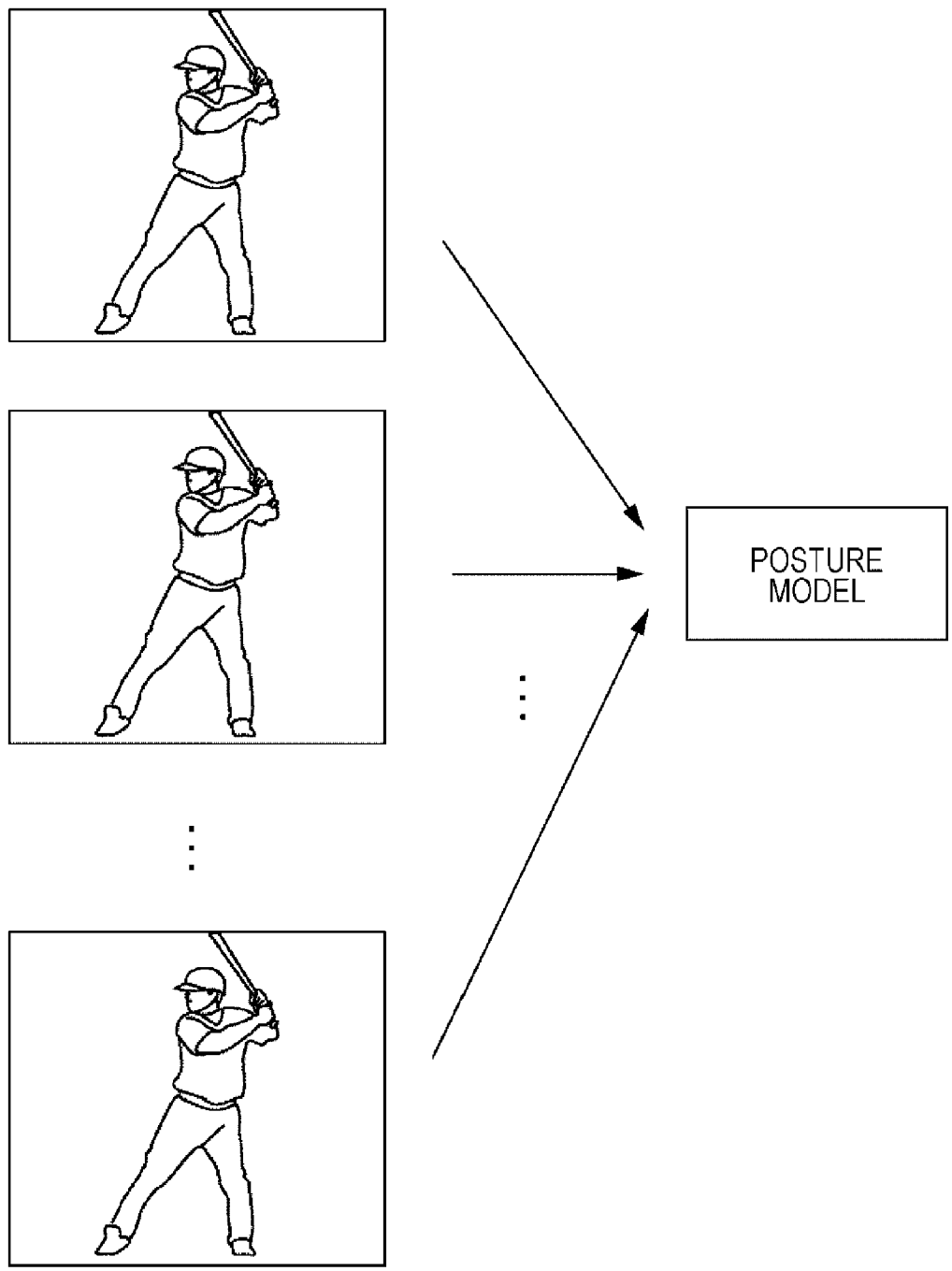
FIG. 3 is a diagram illustrating the generation of a posture model.

FIG. 3 is a diagram illustrating the generation of the posture model.

In the example of FIG. 3, the gesture that serves as a model is a batting form of a designated player.

As illustrated in FIG. 3, the acquisition section 41 acquires, as model moving image data, a plurality of moving image data pieces of the designated player batting from, for example, a database or a cloud server (online storage) of a search site on the Internet via the communication unit 19.

The posture estimation section 42 generates posture data from each of the plurality of model moving image data pieces, and the model generation section 43 performs modeling based on the HMM, or the like using the posture data so as to generate a posture model.

<Description of Process of Model Generation Processing Unit>

Figure 4:
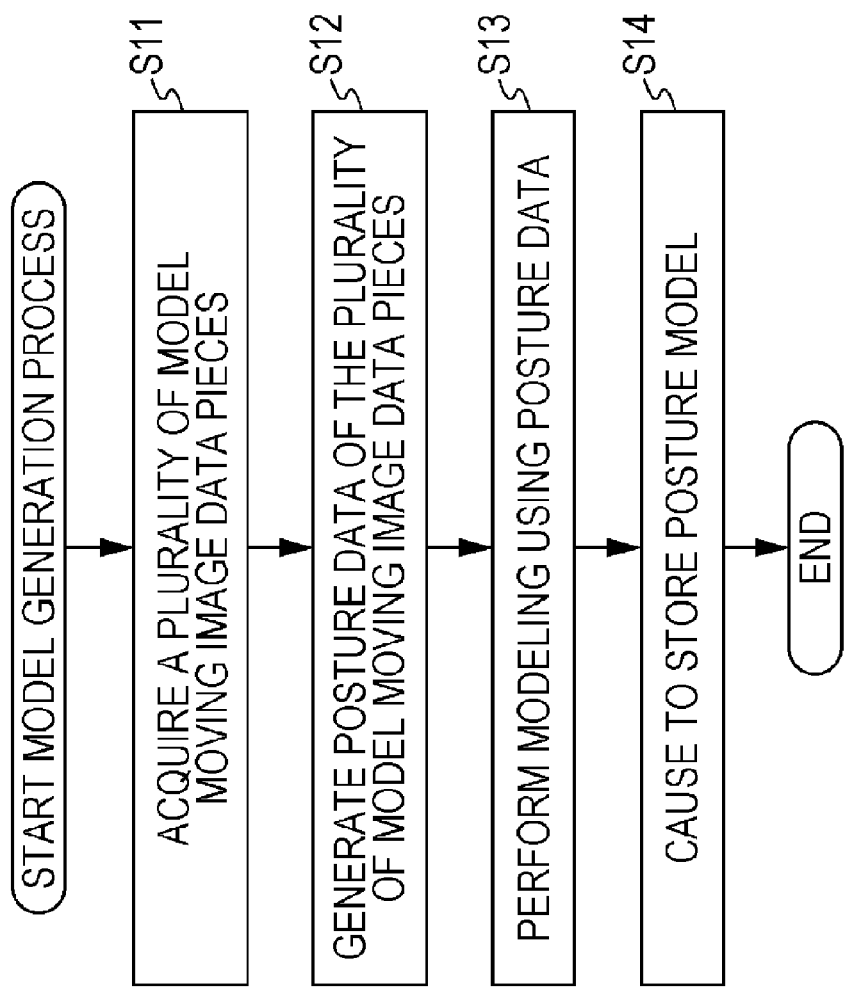
FIG. 4 is a flowchart describing a model generation process of the model generation processing unit of FIG. 2.

FIG. 4 is a flowchart describing a model generation process of the model generation processing unit 40 of FIG. 2.

In Step S11 of FIG. 4, the acquisition section 41 of the model generation processing unit 40 acquires the plurality of model moving image data from the storage unit 18 or from an external server, or the like via the communication unit 19. The acquisition section 41 supplies the plurality of model moving image data pieces to the posture estimation section 42.

In Step S12, the posture estimation section 42 extracts feature amounts from each of the plurality of model moving image data pieces in units of frames, and then generates posture data using the feature amounts. The posture estimation section 42 supplies the posture data of each of the plurality of model moving image data pieces to the model veneration section 43.

In Step S13, the model generation section 43 performs modeling of postures in a time series in the gesture that serves as a model based on the HMM, or the like, using the posture data of the plurality of model moving image data pieces supplied from the posture estimation section 42. The model generation section 43 supplies the posture model generated by the modeling to the storage control section 44.

In Step S14, the storage control section 44 supplies the posture model supplied from the model generation section 43 to the storage unit 18 and causes the storage unit to store the model, and then the process ends.

<Configuration Example of Similarity Calculation Processing Unit>

Figure 5:
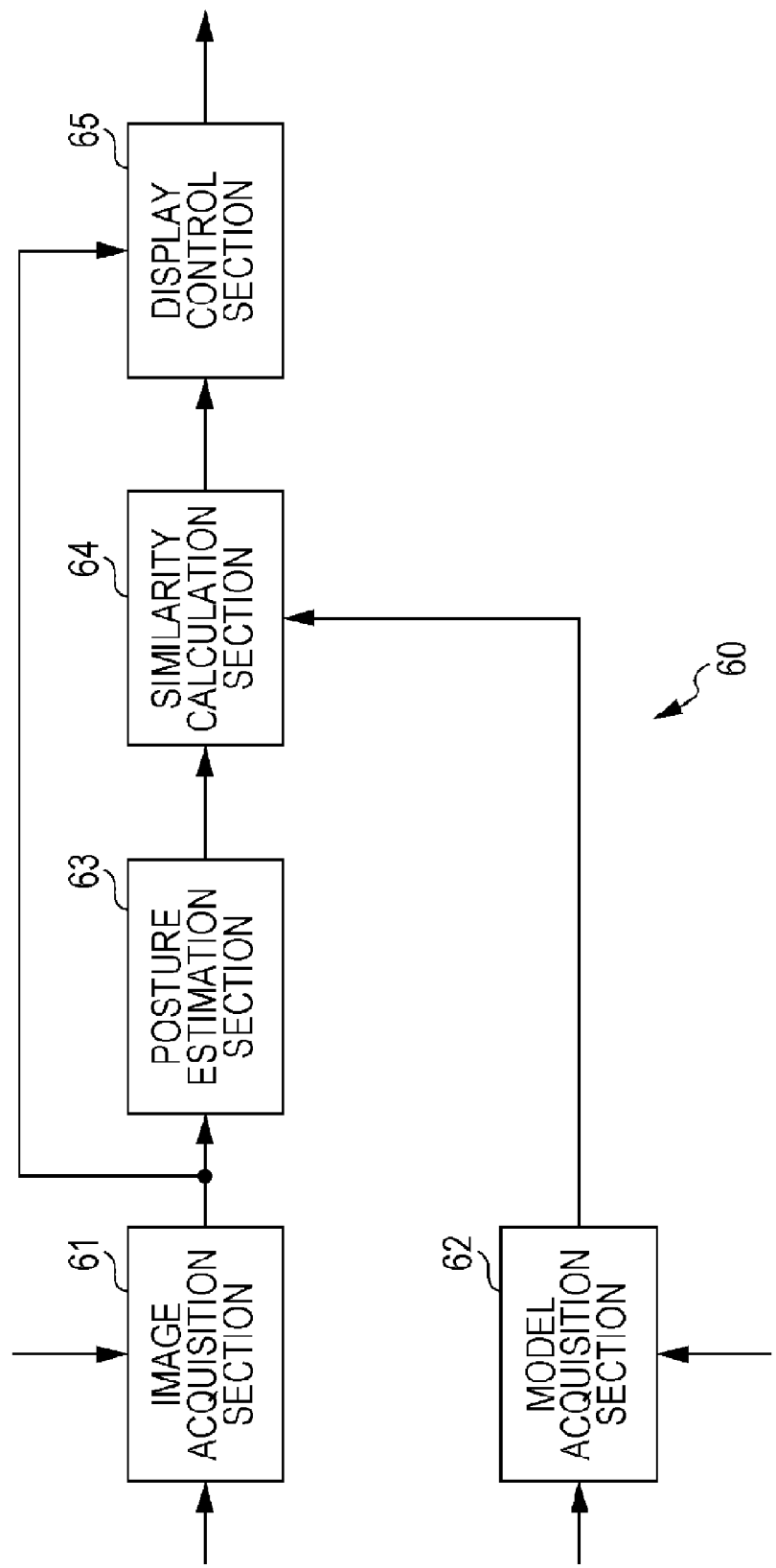
FIG. 5 is a block diagram illustrating a configuration example of a similarity calculation processing unit.

FIG. 5 is a block diagram illustrating a configuration example of the similarity calculation processing unit.

The similarity calculation processing unit 60 of FIG. 5 is constituted by an image acquisition section 61, a model acquisition section 62, a posture estimation section 63, a similarity calculation section 64, and a display control section 65.

The image acquisition section 61 of the similarity calculation processing unit 60 reads moving image data from the storage unit 18 based on a command from the input unit 16 according to an operation of the input unit 16 by the user or acquires moving image data from an external device (not shown) such as a camera, a server, or the like, via the communication unit 19.

Specifically, the user operates the input unit 16 so as to designate, as moving image data to be processed, moving image data of a subject that makes a gesture for which the similarity to the gesture that serves as a model is desired to be ascertained. According to the operation, the input unit 16 supplies a command of acquiring the moving image data to be processed designated by the user to the image acquisition section 61. Based on the command, the image acquisition section 61 acquires the moving image data to be processed from the storage unit 18 or the external device. The image acquisition section 61 supplies the acquired moving image data to be processed to the posture estimation section 63 and the display control section 65.

The model acquisition section 62 reads posture model from the storage unit 18 based on a command from the input unit 16 according to an operation of the input unit 16 by the user. Specifically, the user operates the input unit 16 so as to designate a posture model of the gesture that serves as a model among posture models stored in the storage unit 18. According to the operation, the input unit 16 supplies a command of reading the posture model designated by the user to the model acquisition section 62. Based on the command, the model acquisition section 62 reads the posture model from the storage unit 18. The model acquisition section 62 supplies the read posture model to the posture estimation section 63.

The posture estimation section 63 extracts feature amounts from the moving image data supplied from the image acquisition section 61 in units of frames and then generates posture data using the feature amounts, in the same manner as the posture estimation section 42 of FIG. 2.

The posture estimation section 63 supplies the generated posture data to the similarity calculation section 64 as target posture data.

The similarity calculation section 64 calculates the similarity between the posture model and the target posture data based on the target posture data supplied from the posture estimation section 63 and the posture model supplied from the model acquisition section 62.

Specifically, the similarity calculation section 64 determines a combination of states of the posture model of which the likelihood of each state is at the maximum for the target posture data using the Viterbi algorithm. The similarity calculation section 64 calculates the similarity by performing a predetermined arithmetic operation such as an average value arithmetic operation, or the like, for the likelihood of each determined state. The similarity calculation section 64 supplies the similarity to the display control section 65.

The display control section 65 causes the output unit 17 of FIG. 1 to display various kinds of screens based on the moving image data to be processed supplied from the image acquisition section 61, the similarity supplied from the similarity calculation section 64, and the like.

Note that the number of moving image data pieces to be processed acquired by the image acquisition section 61 may be one or plural. When the number of moving image data pieces to be processed is plural, the similarity is obtained for each of the moving image data pieces to be processed.

<Example of Screen>

Figure 6:
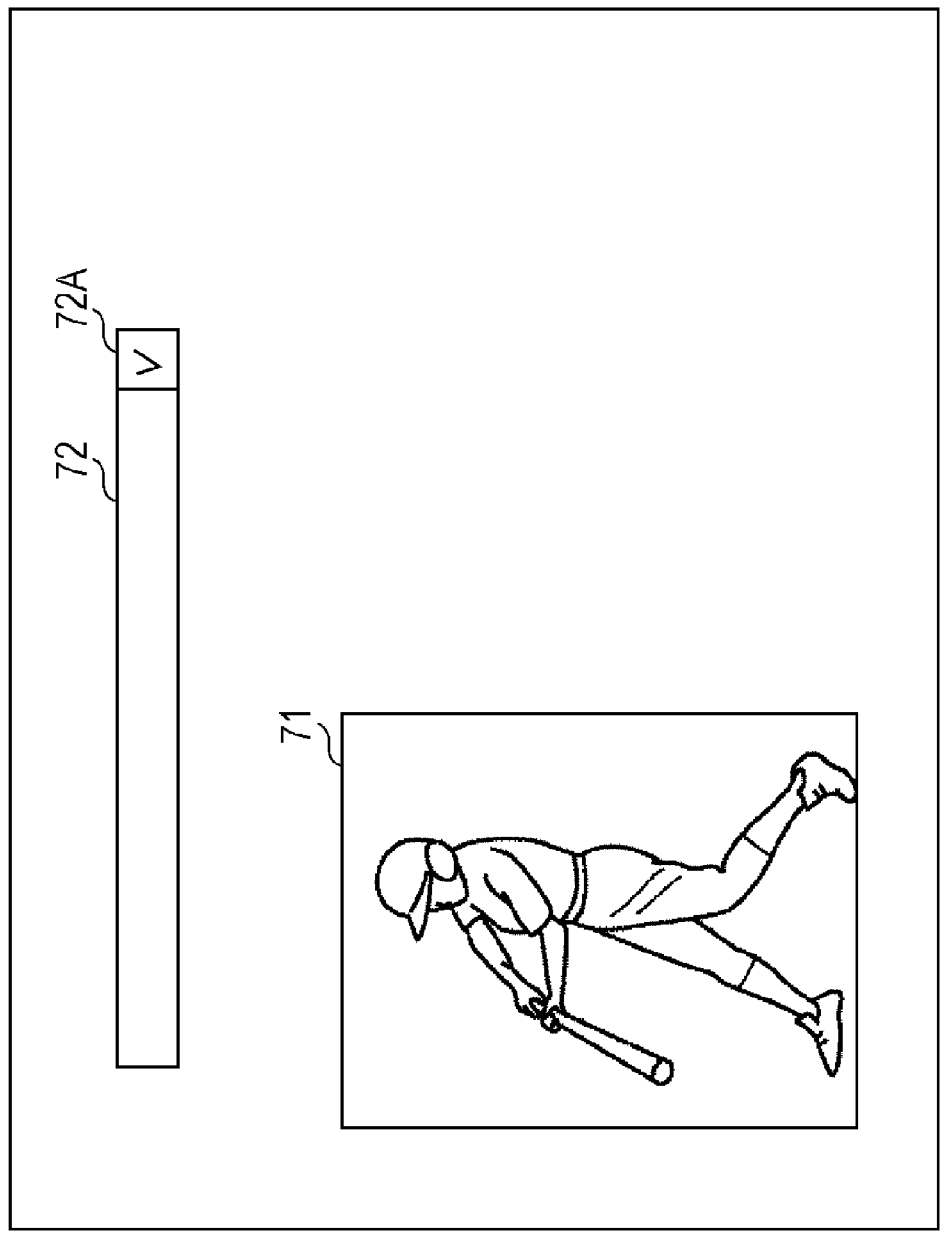
FIG. 6 is a diagram illustrating an example of a screen of when the number of moving image data pieces to be processed is one.
Figure 7:
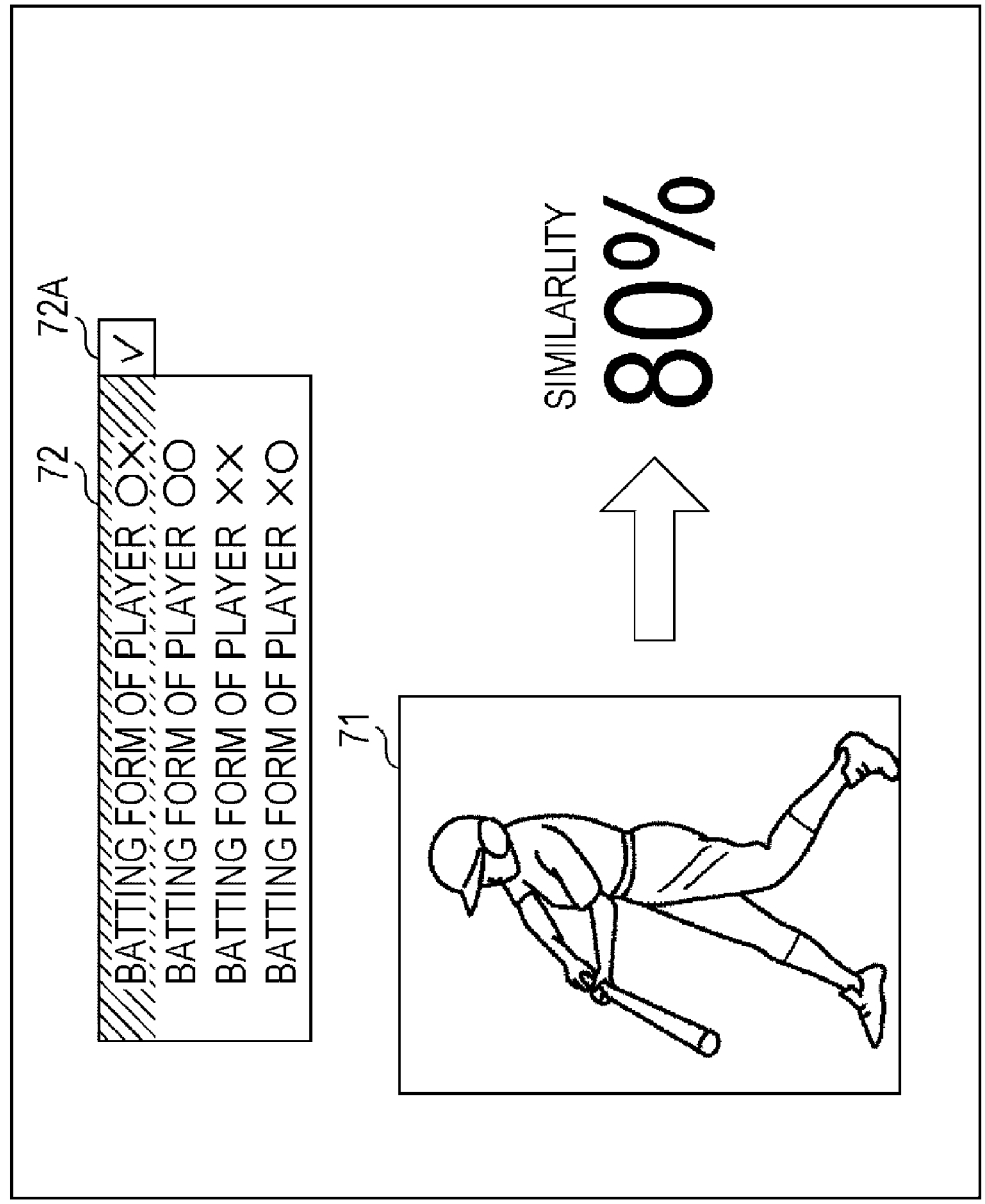
FIG. 7 is a diagram illustrating the example of the screen of when the number of moving image data pieces to be processed is one.
Figure 8:
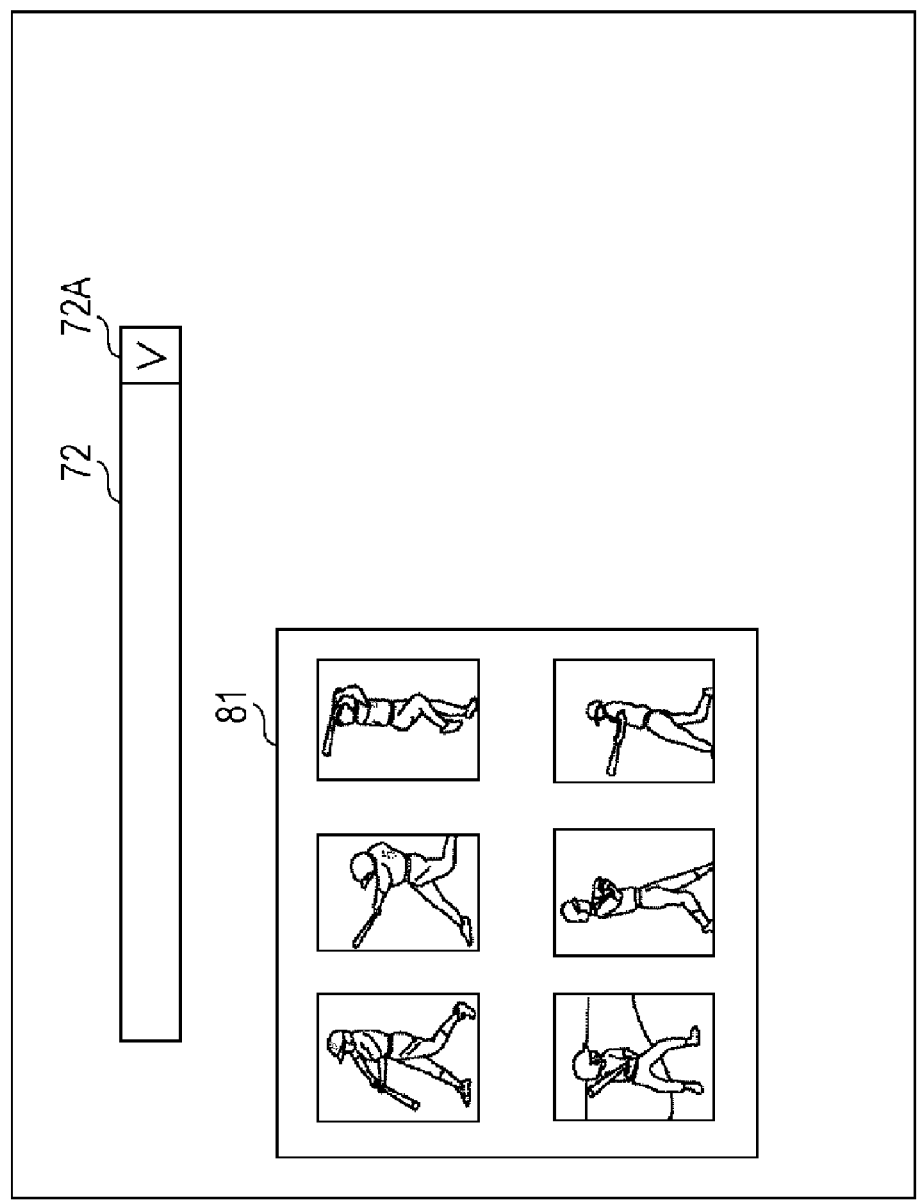
FIG. 8 is a diagram illustrating an example of a screen of when the number of moving image data pieces to be processed is plural.
Figure 9:
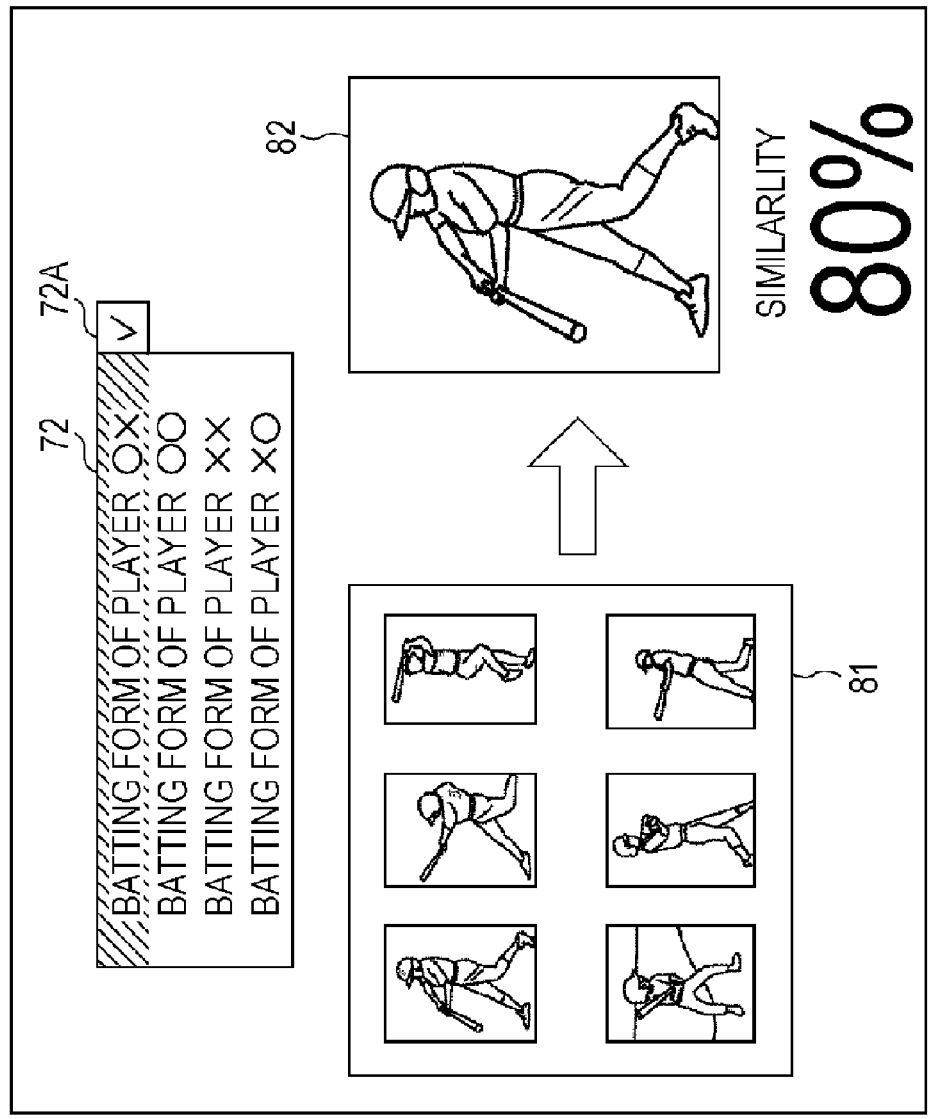
FIG. 9 is a diagram illustrating the example of the screen of when the number of moving image data pieces to be processed is plural.

FIGS. 6 and 7 are diagrams showing examples of screens displayed by the display control section 65 when the number of moving image data pieces to be processed is one, and FIGS. 8 and 9 are diagrams showing examples of screens displayed by the display control section 65 when the number of moving image data pieces to be processed is plural.

In the examples of FIGS. 6 to 9, posture models of batting forms of player OX, player OO, player XX, and player XO are stored in the storage unit 18.

When the number of moving image data pieces to be processed is one, if the user first designates moving image data to be processed by operating the input unit 16, the display control section 65 causes the output unit 17 to display a screen containing an image 71 corresponding to the moving image data and a selection field 72 for selecting a posture model stored in the storage unit 18 as illustrated in FIG. 6. At the right end of the selection field 72, a display button 72A for displaying selection candidates of posture models is provided.

At this moment, first, by operating the display button 72A using an operation of the input unit 16, the user causes the selection field 72 to display information of the posture models stored in the storage unit 18 as information of selection candidates of the posture models as illustrated in FIG. 7. Accordingly, in the selection field 72, as information of each posture model of batting forms of player OX, player OO, player XX, and player XO, "the batting form of player OX", "the batting form of player OO", "the batting form of player XX", and "the batting form of player XO" are displayed.

Next, by selecting information of a desired posture model (in the example of FIG. 7, the batting form of player OX) from information of the selection candidates of the posture models using an operation of the input unit 16, the user designates the posture model. Accordingly, as illustrated in FIG. 7, the information of the posture model selected by the user in the selection field 72 is highlighted. In addition, the similarity between the posture model and target posture data is calculated by the similarity calculation section 64, and based on the similarity, the similarity (in the example of FIG. 7, 80%) is displayed as illustrated in FIG. 7.

Accordingly, the user can easily recognize the similarity between the gesture that serves as a model and the gesture of the subject in the moving image data to be processed. In other words, in the example of FIGS. 6 and 7, the user can easily recognize the similarity between the batting form of player OX that serves as a model and the batting form of the moving image data to be processed. As a result, the user can recognize the state of improvement in his batting form.

On the other hand, when the number of moving image data pieces to be processed is plural (six in the example of FIGS. 8 and 9), first, if the user designates a plurality of moving image data pieces to be processed with an operation of the input unit 16, the display control section 65 causes the output unit 17 to display a screen containing an image group 81 including a plurality of images corresponding to the moving image data pieces and the selection field 72 as illustrated in FIG. 8.

At this moment, by operating the display button 72A with an operation of the input unit 16 in the same manner as in the case of FIG. 6, the user causes the selection field 72 to display information of selection candidates of posture models as illustrated in FIG. 9.

Next, by selecting information of a desired posture model (in the example of FIG. 9, the batting form of player OX) from information of the selection candidates using an operation of the input unit 16, the user designates the posture model. Accordingly, as illustrated in FIG. 9, the information of the posture model selected by the user in the selection field 72 is highlighted. In addition, the similarity between the posture model and target posture data is calculated by the similarity calculation section 64, and based on the similarity, a screen containing the highest similarity (in the example of FIG. 9, 80%) and an image 82 based on the moving image data to be processed corresponding to the similarity is displayed on the output unit 17 as illustrated in FIG. 9.

Accordingly, the user can easily recognize the gesture of the subject in the moving image data to be processed that is the most similar to the gesture that serves as a model. In other words, in the example of FIGS. 8 and 9, the user can easily recognize the batting form of the moving image data to be processed that is the most similar to the batting form of player OX that serves as a model. As a result, the user can recognize which batting form will be optimum, or the like.

Note that images that are displayed on the screens of FIGS. 6 to 9 and which correspond to and are based on the moving image data may be still images, moving images, or thumbnail images.

<Description of Process of Similarity Calculation Processing Unit>

Figure 10:
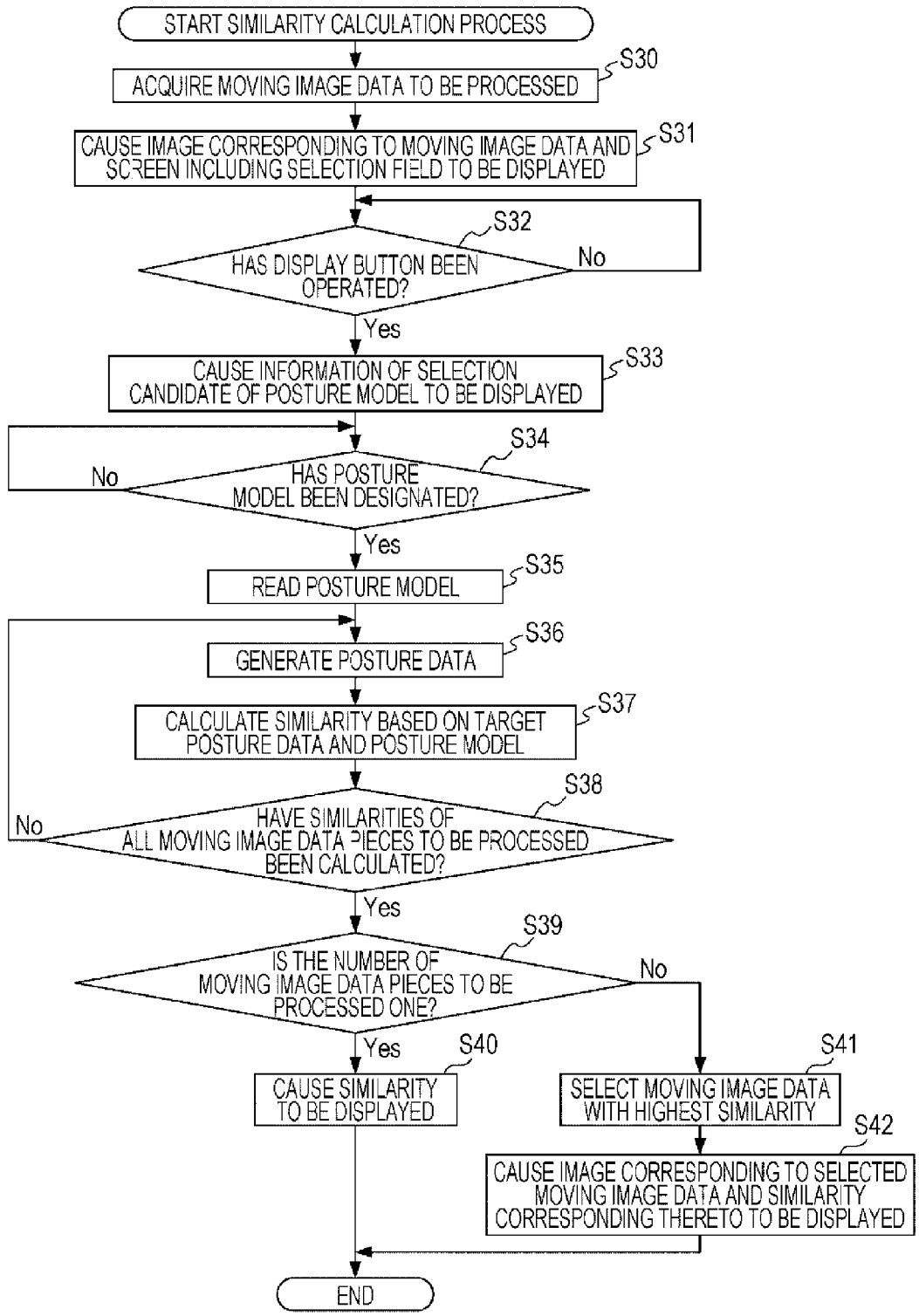
FIG. 10 is a flowchart describing a similarity calculation process of the similarity calculation processing unit of FIG. 5.

FIG. 10 is a flowchart describing the similarity calculation process by the similarity calculation processing unit 60 of FIG. 5. The similarity calculation process is started when the user designates moving image data to be processed by operating the input unit 16.

In Step S30 of FIG. 10, based on a command of acquiring moving image data to be processed designated by the user from the input unit 16, the image acquisition section 61 of the similarity calculation processing unit 60 acquires moving image data to be processed from the storage unit 18 or moving image data to be processed from an external device (not shown) such as a camera, a server, or the like, via the communication unit 19. The image acquisition section 61 supplies the acquired moving image data to be processed to the posture estimation section 63 and the display control section 65.

In Step S31, the display control section 65 causes the output unit 17 of FIG. 1 to display the screen containing the image 71 (or the image group 81) corresponding to the moving image data and the selection field 72 based on the moving image data to be processed supplied from the image acquisition section 61. At this moment, the user operates the display button 72A at the right end of the selection field 72 by operating the input unit 16. Accordingly, the input unit 16 supplies information indicating the operation of the display button 72A to the display control section 65.

In Step S32, the display control section 65 determines whether the display button 72A has been operated by the user or not, in other words, whether the information indicating the operation of the display button 72A has been supplied from the input unit 16 or not. When it is determined that the display button 72A has not been operated in Step S32, the display control section stands by until the display button 72A is operated.

On the other hand, when it is determined that the display button 72A has been operated in Step S32, the display control section 65 causes the information of the posture models stored in the storage unit 18 to be displayed in the selection field 72 as information of selection candidates of the posture models in Step S33. At this moment, by selecting information of a desired posture model among information of the selection candidates of the posture models displayed in the selection field 72 with an operation of the input unit 16, the user designates the posture model. Accordingly, the input unit 16 supplies a command of reading the posture model designated by the user to the model acquisition section 62.

In Step S34, the model acquisition section 62 determines whether the posture model has been designated by the user or not, in other words, a command of reading the posture model designated by the user has been supplied from the input unit 16 or not. In Step S34, when it is determined that the posture model has not yet been designated by the user, the section stands by until a posture model is designated by the user.

In Step S34, when it is determined that the posture model has been designated by the user, the model acquisition section 62 reads the posture model designated by the user from the storage unit 18 in Step S35. The model acquisition section 62 supplies the read posture model to the similarity calculation section 64.

In Step S36, the posture estimation section 63 extracts feature amounts from moving image data of which posture data has not been generated in units of frames among moving image data supplied from the image acquisition section 61 in the same manner as the posture estimation section 42 of FIG. 2, and generates posture data using the feature amounts. The posture estimation section 63 supplies the generated posture data to the similarity calculation section 64 as target posture data.

In Step S37, the similarity calculation section 64 calculates the similarity between the posture model and the target posture data based on the target posture data supplied from the posture estimation section 63 and the posture model supplied from the model acquisition section 62. The posture estimation section 63 supplies the similarity to the display control section 65.

In Step S38, the posture estimation section 63 determines whether the similarities of all moving image data pieces to be processed have been calculated or not. When it is determined that the similarities of all moving image data pieces to be processed have not yet been calculated in Step S38, the process returns to Step S36, and the processes from Step S36 to S38 are repeated until the similarities of all moving image data pieces to be processed are calculated.

In Step S39, the display control section 65 determines whether the number of moving image data pieces to be processed is one or not. When it is determined that the number of moving image data pieces to be processed is one in Step S39, the display control section 65 causes the similarity supplied from the posture estimation section 63 to be displayed on the output unit 17 of FIG. 1 in Step S40. Accordingly, the screen of FIG. 7 is displayed on the output unit 17.

On the other hand, when it is determined that the number of moving image data pieces to be processed is not one in Step S39, in other words, when the number of moving image data pieces to be processed is plural, the process advances to Step S41. In Step S41, the display control section 65 selects a moving image data piece having the highest similarity supplied from the similarity calculation section 64 among moving image data pieces to be processed supplied from the image acquisition section 61.

In Step S42, the display control section 65 causes the image corresponding to the moving image data piece selected in Step S41 and the similarity corresponding thereto to be displayed on the output unit 17 of FIG. 1. Accordingly, the screen of FIG. 9 is displayed on the output unit 17.

As above, since the information processing device 10 calculates the similarity between target posture data and a posture model, and causes a screen to be displayed based on the similarity, it is possible to present the user with the similarity between a gesture that serves as a model and a gesture of a subject in moving image data to be processed.

Accordingly, it is possible to recognize to what degree a physical activity in, for example, various kinds of sports, dances, operations of driving equipment of vehicle, aircrafts, craftworks, and the like is similar to a gesture that serves as a model, and to correct the physical activity.

Note that, in the first embodiment, one posture model is designated by a user, but a plurality of posture models may be designated. In this case, the similarities of each of the posture models are calculated, and the display control section 65 causes information on the posture model with the highest similarity to be displayed with a screen containing an image corresponding to moving image data to be processed and the similarity.

In addition, in the first embodiment, a posture model is learned using a plurality of model moving image data pieces, but a posture model may be learned using posture data of one model moving image data piece. In this case, the posture data of the model moving image data is vectorized, and then turned into a posture model. Note that, even when a posture model is learned using a plurality of model moving image data pieces, the posture model may be generated by vectorizing posture data of the model moving image data, optimizing (equalization, or the like) vectors obtained from the result, and then obtaining a representative vector.

<Second Embodiment>
<Configuration Example of First Embodiment of Information Processing System>

Figure 11:
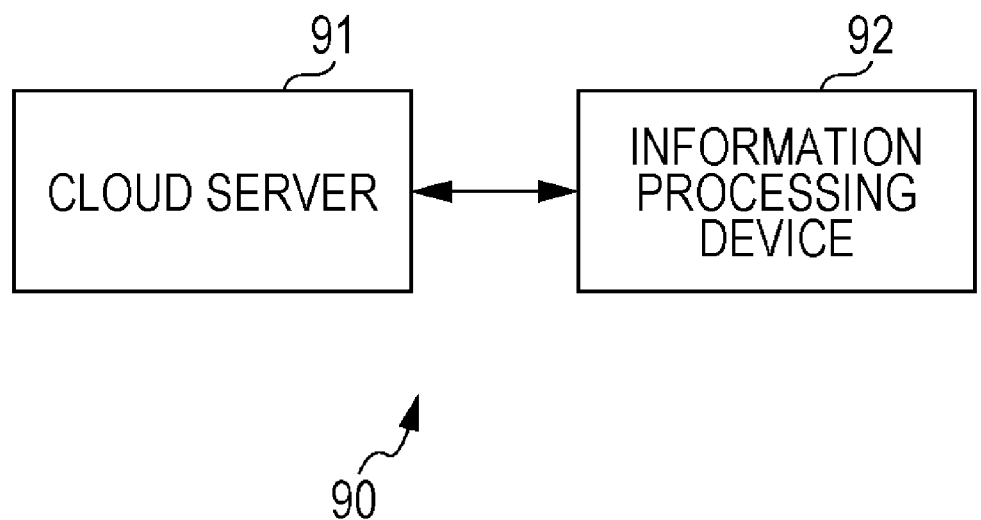
FIG. 11 is a block diagram illustrating a configuration example of a first embodiment of an information processing system to which the present technology is applied.

FIG. 11 is a block diagram illustrating a configuration example of a first embodiment of an information processing system to which the present technology is applied.

As illustrated in FIG. 11, the information processing system 90 is constituted by a cloud server 91 and an information processing device 92. In the information processing system 90, not the information processing device 92 but the cloud server 91 generates a posture model, and transmits the model to the information processing device 92.

Specifically, the cloud server 91 performs a model generation process in the same manner as the information processing device 10. In addition, the cloud server 91 transmits a stored predetermined posture model to the information processing device 92 according to a request from the information processing device 92.

The information processing device 92 requests to the cloud server 91 transmission of a posture model designated by the user in the same manner as the information processing device 10. The information processing device 92 receives the posture model transmitted from the cloud server 91 according to the request. The information processing device 92 performs a similarity calculation process in the same manner as the information processing device 10 using the received posture model.

<Third Embodiment>
<Configuration Example of Second Embodiment of Information Processing Device>

Figure 12:
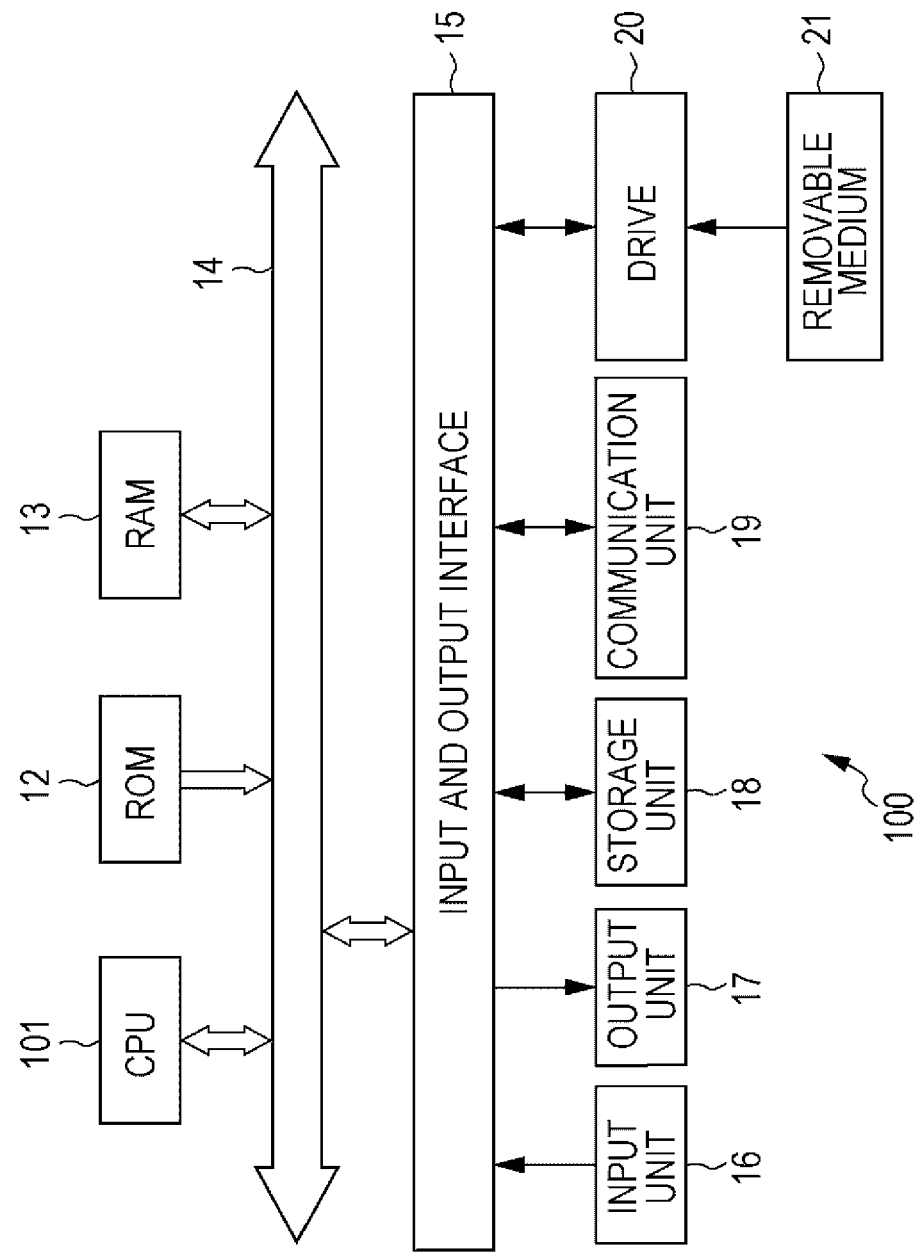
FIG. 12 is a block diagram illustrating a configuration example of hardware of a second embodiment of the information processing device to which the present technology is applied.

FIG. 12 is a block diagram illustrating a configuration example of hardware of a second embodiment of the information processing device to which the present technology is applied.

In the configuration illustrated in FIG. 12, the same reference numerals are given to the same configuration as that of FIG. 1. Overlapping description will be appropriately omitted.

The configuration of an information processing device 100 of FIG. 12 has the difference from that of FIG. 1 in that a CPU 101 is provided instead of the CPU 11. The information processing device 100 sets a gesture of a subject of moving image data designated by a user as a search key to be a gesture that serves as a model, and sets moving image data to be processed of which the similarity is within a predetermined range to be a search result.

Specifically, the CPU 101 of the information processing device 100 performs various kinds of processes by loading a program stored in the storage unit 18 on the RAM 13 and executing the program via the input and output interface 15 and the bus 14. For example, the CPU 101 generates a posture model using posture data of moving image data designated by the user as a search key, and after generating target posture data, and performs a search process in which moving image data to be processed for which the similarity between the posture model and the target posture data is within a predetermined range is set to be a search result. In other words, the CPU 101 functions as a search processing unit that performs a search process.

<Configuration Example of Search Processing Unit>

Figure 13:
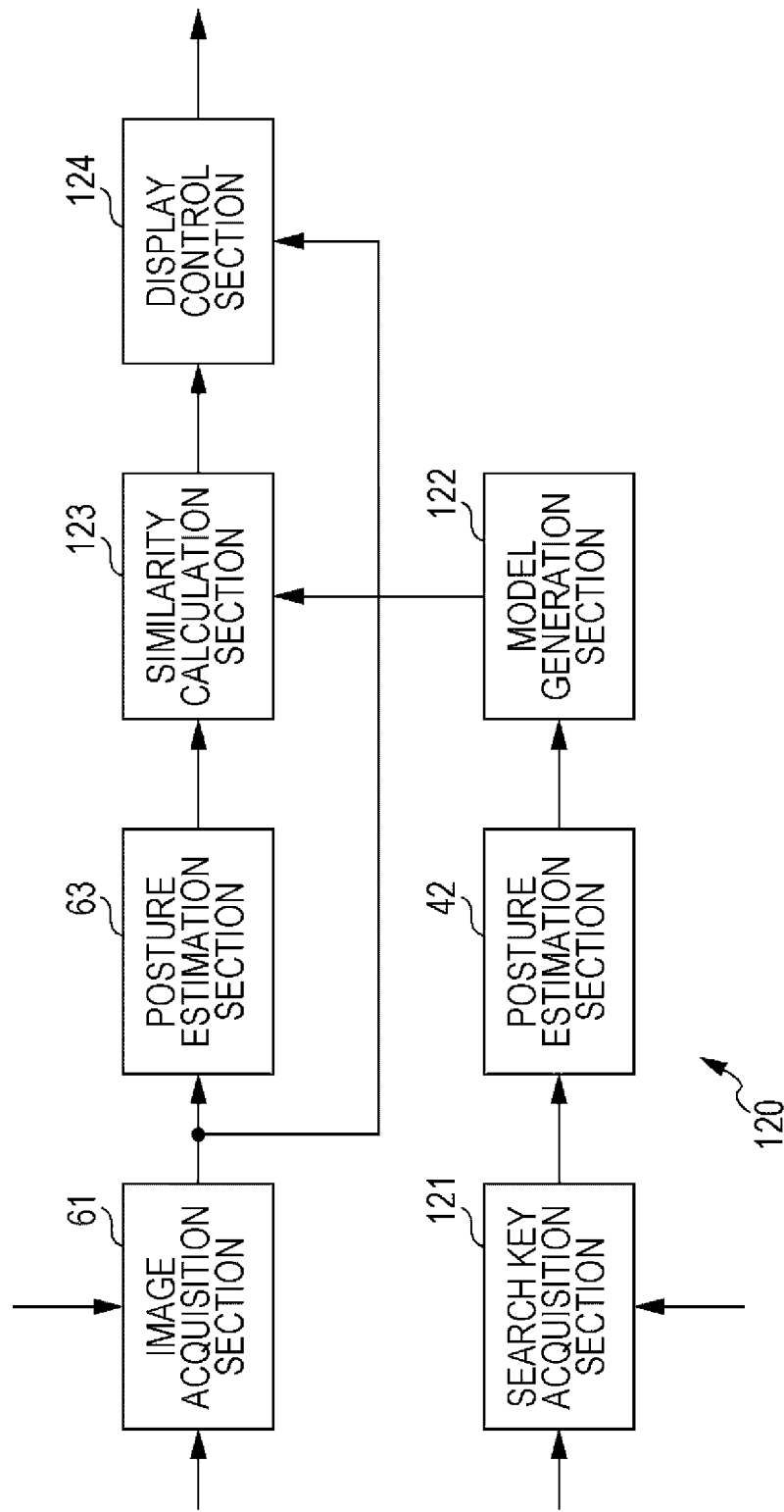
FIG. 13 is a block diagram illustrating a configuration example of a search processing unit.

FIG. 13 is a block diagram illustrating a configuration example of a search processing unit 120.

In the configuration illustrated in FIG. 13, the same reference numerals are given to the same configuration as those of FIGS. 2 and 5. Overlapping description will be appropriately omitted.

The search processing unit 120 of FIG. 13 is constituted by the posture estimation section 42, the image acquisition section 61, the posture estimation section 63, a search key acquisition section 121, a model generation section 122, a similarity calculation section 123, and a display control section 124.

The search key acquisition section 121 of the search processing unit 120 reads moving image data from the storage unit 18 or acquires moving image data from an external device (not shown) such as a camera, a server, or the like, via the communication unit 19 based on a command from the input unit 16 according to an operation of the input unit 16 by the user.

Specifically, the user operates the input unit 16 so as to designate moving image data of a subject making a gesture that serves as a search key as model moving image data. The input unit 16 supplies a command of acquiring the model moving image data to the search key acquisition section 121 according to the operation. The search key acquisition section 121 acquires the model moving image data from the storage unit 18 or an external device based on the command. The search key acquisition section 121 supplies the acquired model moving image data to the posture estimation section 42.

Using posture data of the model moving image data supplied from the posture estimation section 42, the model generation section 122 vectorizes the posture data. The model generation section 122 supplies the vector of the posture data obtained from the result to the similarity calculation section 123 as a posture model.

The similarity calculation section 123 vectorizes target posture data supplied from the posture estimation section 63. The similarity calculation section 123 calculates the distance between the vector of the target posture data obtained from the result and the posture model supplied from the model acquisition section 62, and then calculates the similarity between the posture model and the target posture data based on the distance. The similarity calculation section 123 supplies the calculated similarity to the display control section 124.

The display control section 124 causes various kinds of screens to be displayed on the output unit 17 of FIG. 12 based on moving image data to be processed supplied from the image acquisition section 61 and the similarity, or the like supplied from the similarity calculation section 123. For example, the display control section 124 causes screens displaying images corresponding to moving image data for which the similarity is within a predetermined range, among the moving image data to be processed as search results to be displayed on the output unit 17.

<Example of Screen>

FIGS. 14 to 17 are diagrams showing examples of screens displayed by the display control section 124 of FIG. 13.

Figure 14:
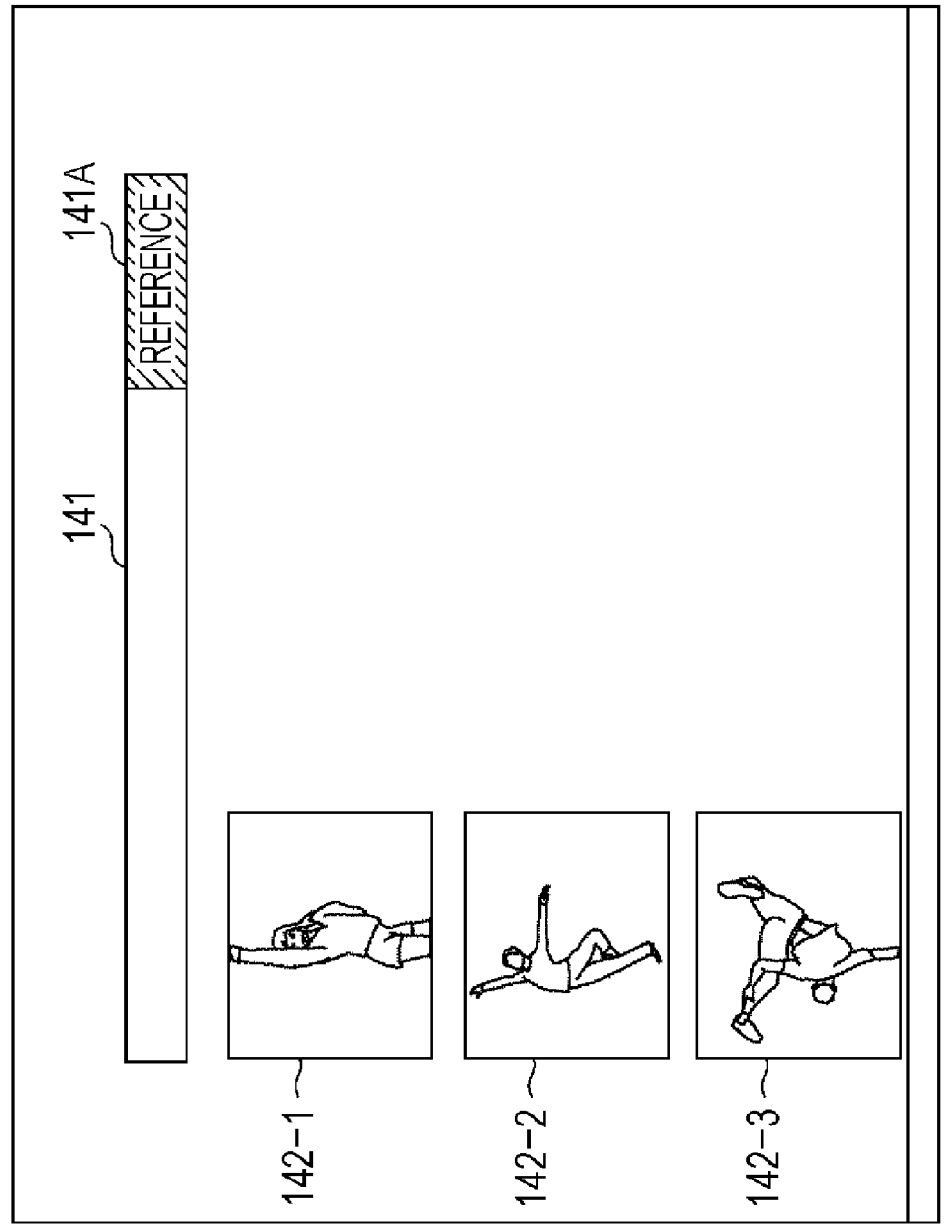
FIG. 14 is a diagram illustrating an example of a screen displayed by a display control section of FIG. 13.

First, if the user designates moving image data to be processed by operating the input unit 16, the display control section 124 causes images 142-1 to 142-3 corresponding to the moving image data and an input field 141 into which files of the moving image data of the gesture that serves as a search key are input to be displayed as illustrated in FIG. 14. At the right end of the input field 141, a reference button 141A that supports an input of the files of moving image data of the gesture that serves as a search key is provided.

Figure 15:
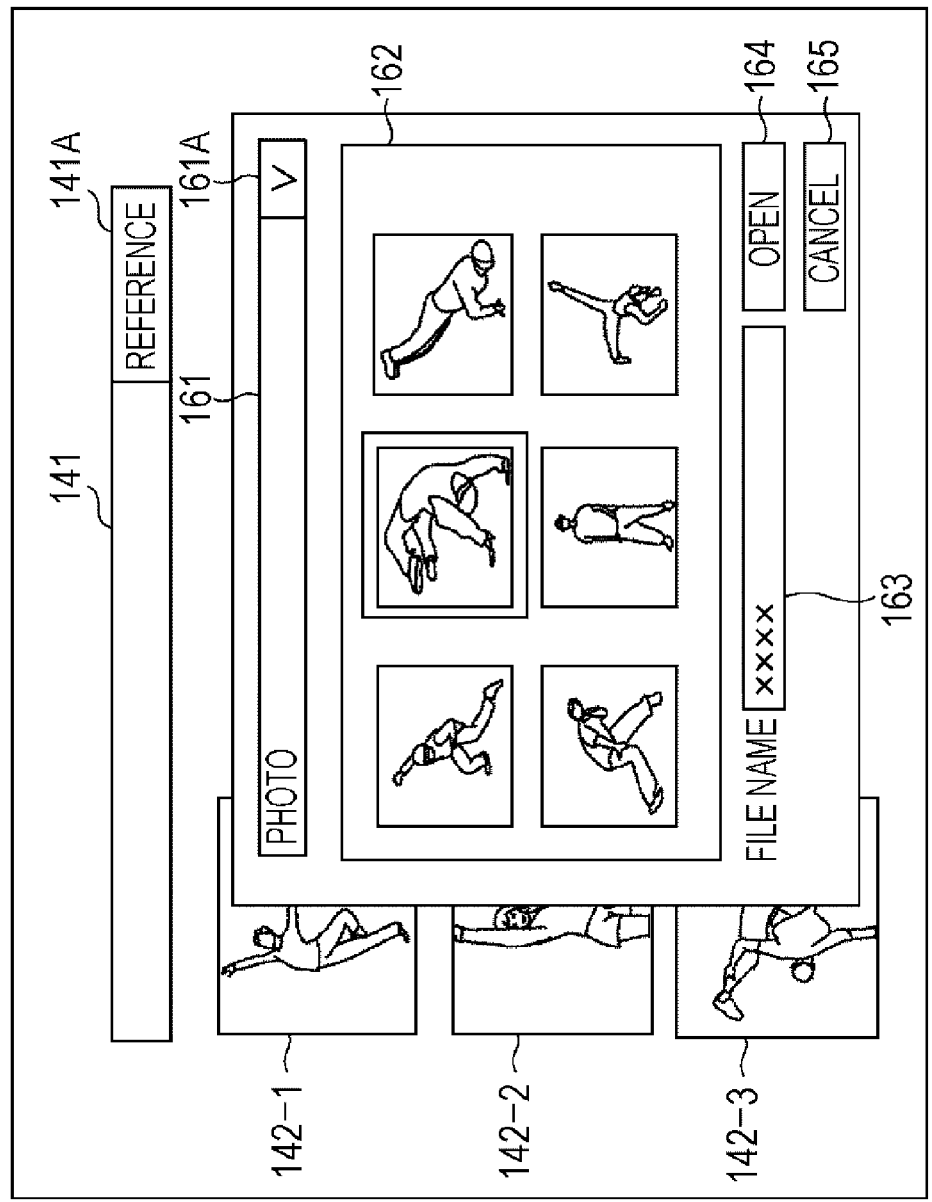
FIG. 15 is a diagram illustrating an example of another screen displayed by the display control section of FIG. 13.

If the user operates the reference button 141A by operating the input unit 16, the display control section 124 causes a screen containing a folder selection field 161, a file display part 162, a file name input field 163, an open button 164, and a cancel button 165 to be displayed as illustrated in FIG. 15.

In the folder selection field 161, a predetermined file name (in the example of FIG. 15, "photo") is first displayed. At the right end of the folder selection field 161, a display button 161A for displaying the file name of a selection candidate folder is provided.

When the user desires to set moving image data of a file in a folder other than the folder of the folder name displayed in the folder selection field 161 to be a search key, the folder names of folders in the selection candidates is caused to be displayed in the folder selection field 161 by operating the display button 161A with an operation of the input unit 16. Then, the user can select the folder name of the folder including the file of the moving image data of a gesture that serves as a search key from the folder names by operating the input unit 16. Accordingly, the folder name selected by the user is displayed in the folder selection field 161.

In the file display part 162, information indicating moving image data of files included in the folder of the folder name displayed in the folder selection field 161 is displayed. In the example of FIG. 15, thumbnail images of moving image data are displayed as the information indicating the moving image data. At this moment, by operating the input unit 16, the user selects information of a file of moving image data of the gesture that serves as a search key from the information displayed in the file display part 162. Accordingly, the selected information is, for example, highlighted as illustrated in FIG. 15.

In the file name input field 163, the file name of the file corresponding to the information selected by the user in the file display part 162 is displayed.

Figure 16:
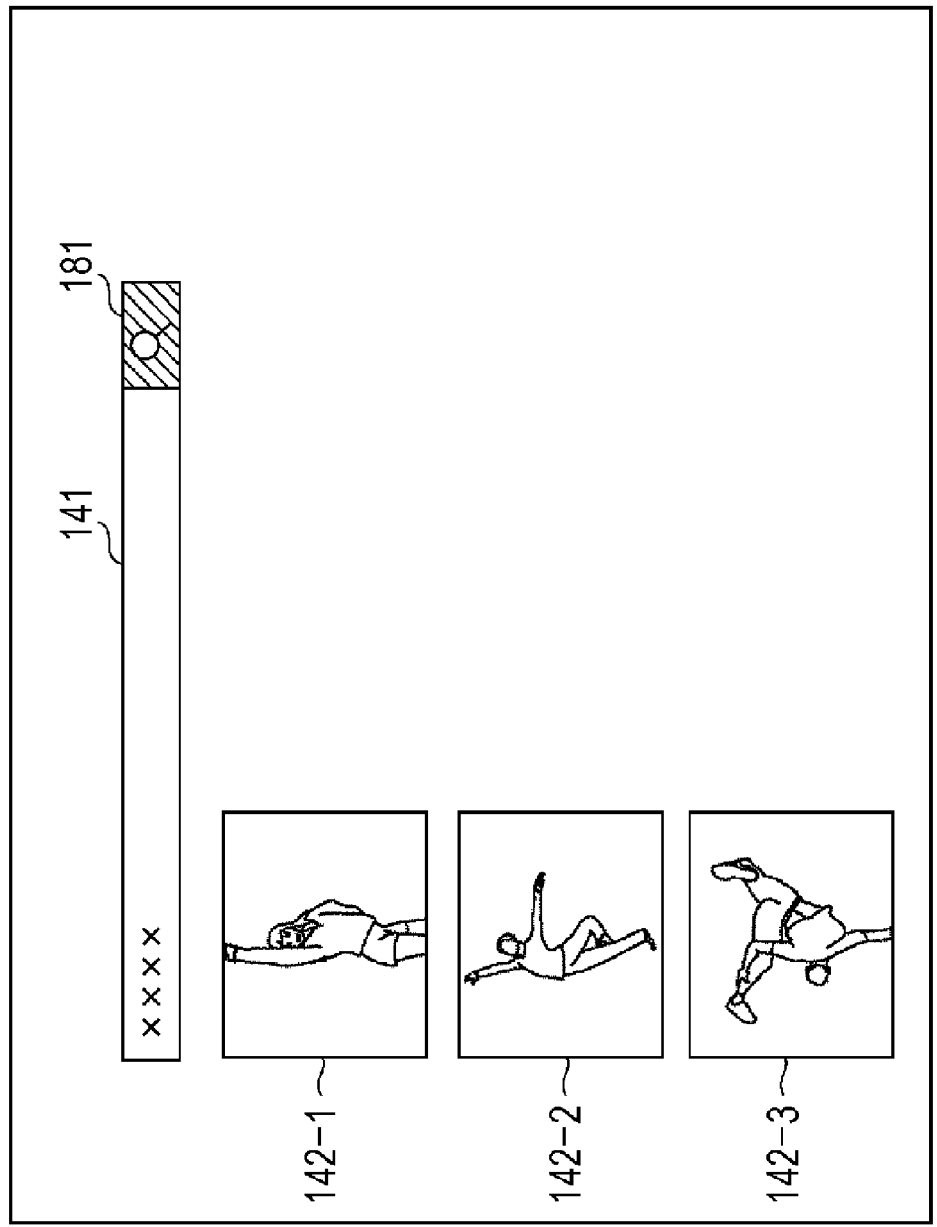
FIG. 16 is a diagram illustrating an example of still another screen displayed by the display control section of FIG. 13.

The open button 164 is a button to be operated when the file of the file name displayed in the file name input field 163 is input to the input field 141. Thus, when the user operates the open button 164 by operating the input unit 16, the file name displayed in the file name input field 163 is displayed in the input field 141 and at the right end of the input field 141, a search button 181 for starting search is displayed instead of the reference button 141A as illustrated in FIG. 16.

Figure 17:
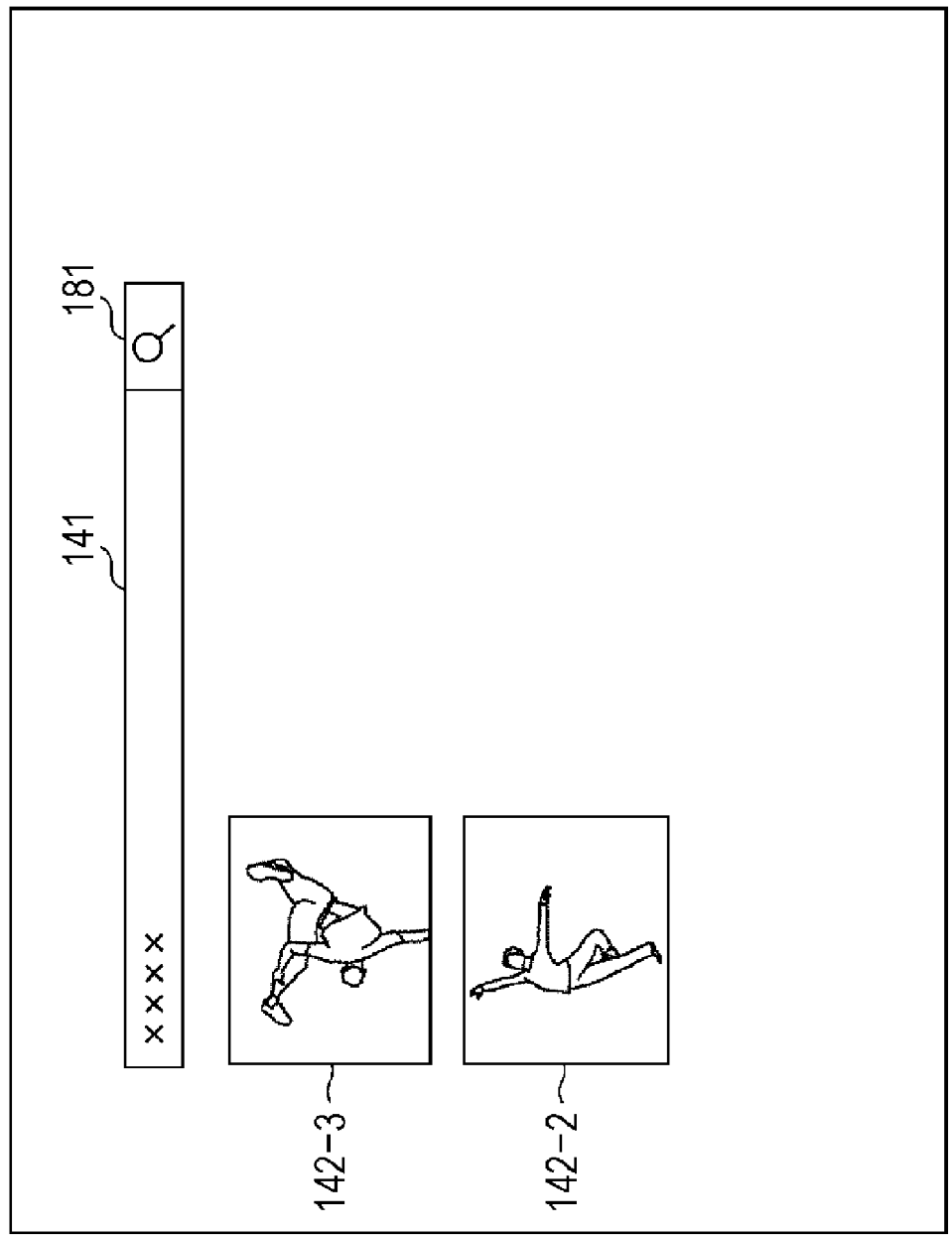
FIG. 17 is a diagram illustrating an example of still another screen displayed by the display control section of FIG. 13.

At this moment, by operating the search button 181 with an operation of the input unit 16, the user designates the moving image data of the file of the file name displayed in the input field 141 as model moving image data. Accordingly, the similarity between the model moving image data and the moving image data to be processed is calculated, and images corresponding to the moving image data to be processed for which the similarity is within a predetermined range are displayed as search results in order from the highest similarity, as illustrated in FIG. 17. In the example of FIG. 17, among the images 142-1 to 142-3, the images 142-2 and 142-3 are displayed in the order of the image 142-3 and the image 142-2.

As above, by inputting a file of moving image data of a subject making a desired gesture as a file of moving image data of a gesture that serves as a search key, the user can search for moving image data of subjects making gestures similar to the foregoing gesture. In other words, in the example of FIGS. 14 to 17, since the user inputs a file of moving image data of a subject making a desired choreographed dance as a file of moving image data of a gesture that serves as a search key, it is possible to search for moving image data of subjects performing a dance similar to the foregoing dance.

On the other hand, the cancel button 165 of FIG. 15 is a button to be operated when an input of a file of moving image data of a gesture that serves as a search key is quit. Thus, if the user operates the cancel button 165 by operating the input unit 16, the screen of FIG. 14 is displayed again.

<Description of Process of Search Processing Unit>

Figure 18:
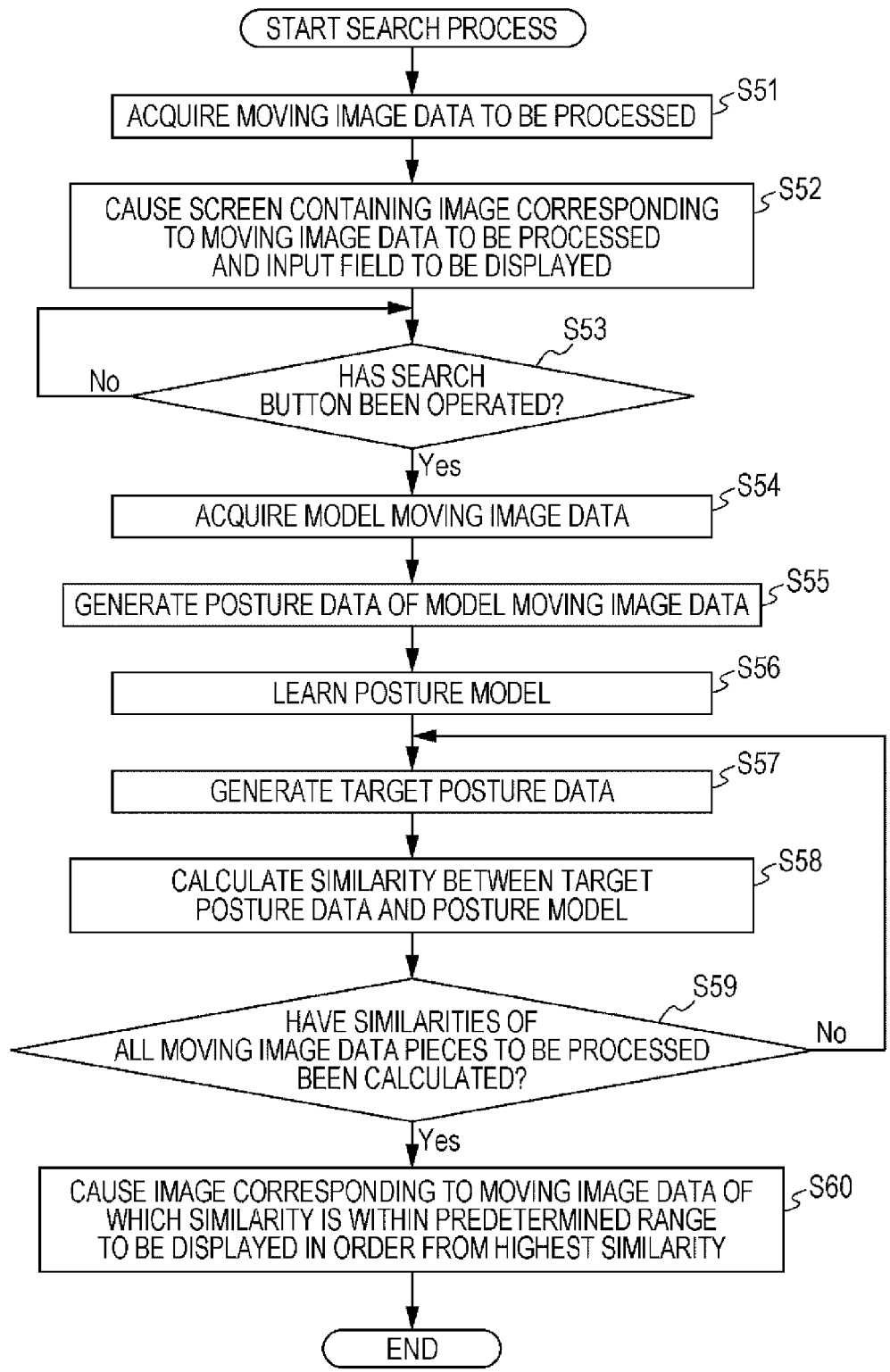
FIG. 18 is a flowchart describing a search process by the search processing unit of FIG. 13.

FIG. 18 is a flowchart describing a search process by the search processing unit 120 of FIG. 13. The search process is started when the user designates moving image data to be processed by operating the input unit 16.

In Step S51, the image acquisition section 61 of the search processing unit 120 acquires moving image data to be processed from the storage unit 18 or acquires moving image data from an external device (not shown) such as a camera, a server, or the like, via the communication unit 19 based on a command of acquiring moving image data to be processed designated by the user from the input unit 16. The image acquisition section 61 supplies the acquired moving image data to be processed to the posture estimation section 63 and the display control section 124.

In Step S52, the display control section 124 causes the screen of FIG. 14 containing the images 142-1 to 142-3 and the input field 141 corresponding to the moving image data to be processed to be displayed based on the moving image data to be processed supplied from the image acquisition section 61.

At this moment, the user operates the reference button 141A with an operation of the input unit 16 so as to cause the screen of FIG. 15 containing the folder selection field 161, the file display part 162, the file name input field 163, the open button 164, and the cancel button 165 to be displayed. Then, the user changes the folder name displayed in the folder selection field 161 by operating the display button 161A as necessary.

In addition, the user selects information on a file of moving image data of a gesture that serves as a search key from information indicating moving image data displayed in the file display part 162, by operating the input unit 16. The user operates the open button 164 with an operation of the input unit 16 and inputs the file of the moving image data of the gesture that serves as a search key into the input field 141.

Accordingly, the display control section 124 causes the file name of the file of the moving image data of the gesture that serves as a search key input by the user to be displayed in the input field 141, and causes the search button 181 to be displayed instead of the reference button 141A as illustrated in FIG. 16. At this moment, the user operates the search button 181 by operating the input unit 16. According to the operation, the input unit 16 supplies a command of acquiring the model moving image data of the file input by the user as model moving image data to the search key acquisition section 121.

In Step S53, the search key acquisition section 121 determines whether the search button 181 has been operated or not, in other words, whether a command of acquiring the model moving image data from the input unit 16 has been supplied or not. When it is determined that the search button 181 has not been operated in Step S53, the search key acquisition section stands by until the search button 181 is operated.

On the other hand, when it is determined that the search button 181 has been operated in Step S53, the process advances to Step S54. In Step S54, the search key acquisition section 121 acquires the moving image data of the file input by the user from the storage unit 18 as the model moving image data, or acquires the data from an external device (not shown) such as a camera, a server, or the like, via the communication unit 19. The search key acquisition section 121 supplies the acquired model moving image data to the posture estimation section 42.

In Step S55, the posture estimation section 42 extracts feature amounts of the posture of the subject from the moving image data supplied from the search key acquisition section 121 in units of frames, and generates posture data using the feature amounts. The posture estimation section 42 supplies the posture data of the model moving image data to the model generation section 122.

In Step S56, the model generation section 122 vectorizes the posture data using the posture data of the model moving image data supplied from the posture estimation section 42, and learns the vector of the posture data obtained from the result as a posture model. The model generation section 122 supplies the posture model to the similarity calculation section 123.

In Step S57, the posture estimation section 63 generates target posture data from moving image data of which posture data has not yet been generated from the moving image data to be processed supplied from the image acquisition section 61 in the same manner as the posture estimation section 42. The posture estimation section 63 supplies the generated target posture data to the similarity calculation section 123.

In Step S58, the similarity calculation section 123 calculates the similarity between the target posture data and the posture model. Specifically, the similarity calculation section 123 vectorizes the target posture data supplied from the posture estimation section 63, and calculates the distance between the vector of the target posture data obtained from the result and the posture model supplied from the model acquisition section 62. Then, the similarity calculation section 123 calculates the similarity of the posture model and the target posture data based on the distance. The similarity calculation section 123 supplies the calculated similarity to the display control section 124.

In Step S59, the similarity calculation section 123 determines whether the similarities of all moving image data pieces to be processed have been calculated or not. When it is determined that the similarities of all moving image data pieces to be processed have not yet been calculated in Step S59, the process returns to Step S57, and the processes of Steps S57 to S59 are performed until the similarities of all moving image data pieces to be processed are calculated.

When it is determined that the similarities of all moving image data pieces to be processed have been calculated in Step S59, the process advances to Step S60. In Step S60, the display control section 124 causes images corresponding to moving image data for which the similarity is within a predetermined range among the moving image data to be processed to be displayed as search results in order from the highest similarity as illustrated in FIG. 17.

As above, the information processing device 100 calculates the similarity between the target posture data and the posture model of when the moving image data of the gesture that serves as a search key is set to be the model moving image data, and based on the similarity, causes images corresponding to the moving image data of which the similarity is within a predetermined range to be displayed as search results in order from the highest similarity. Thus, the user can perform a search by setting a desired gesture to be a search key. As a result, it is possible to perform a search by setting a gesture that is difficult to be described in sentences, such as, choreography of a dance, the movement of an actor or an actress in a specific scene of a film, a motion of a child, or the like, as a search key.

Note that, in the third embodiment, one model moving image data piece is designated by the user, but a plurality of model moving image data pieces may be designated. In this case, posture data of the plurality of model moving image data pieces are vectorized, and the vectors of the posture data obtained from the result are optimized so as to generate posture models. Note that, in this case, the posture models may be generated based on the HMM in the same manner as in the first and the second embodiments.

<Fourth Embodiment>
<Configuration Example of Second Embodiment of Information Processing System>

FIG. 19 is a block diagram illustrating a configuration example of a second embodiment of the information processing system to which the present technology is applied.

As illustrated in FIG. 19, an information processing system 200 is constituted by a cloud server 201 and an information processing device 202. In the information processing system 200, not the information processing device 202 but the cloud server 201 generates target posture data, and transmits the data to the information processing device 202.

Specifically, the cloud server 201 acquires moving image data to be processed in the same manner as the information processing device 100 according to a request from the information processing device 202, and generates target posture data. Then, the cloud server 201 transmits the target posture data to the information processing device 202.

The information processing device 202 request to the cloud server 201 the transmission of the target posture data that is posture data of moving image data to be processed designated by the user in the same manner as the information processing device 100. The information processing device 202 receives the target posture data transmitted from the cloud server 201 according to the request. The information processing device 202 generates a posture model in the same manner as the information processing device 100, calculates the similarity between the received target posture data and the posture model, and displays a screen based on the similarity.

Note that, in the first to the fourth embodiments, the similarity between target posture data and a posture model is calculated, but the similarity between a posture model and a feature amount of a characteristic frame (for example, a frame with a large movement of the joints) among target posture data may be calculated.

In addition, in the present specification, the step of describing a program stored on a program recording medium includes a process performed in a time series according to an order described as well as a process performed in parallel or in an individual manner, though not necessarily performed in a time series.

Furthermore, in the present specification, a system means a set of a plurality of constituent elements (such as devices, and modules (components)), regardless of whether all the constituent components are in the same housing. Therefore, a plurality of devices that are accommodated in separate housings and connected via a network and one device in which a plurality of modules are accommodated in one housing are all systems.

In addition, an embodiment of the present technology is not limited to the above-described embodiments, and can be variously modified within a scope not departing from the gist of the present technology.

In the information processing system 90, for example, the cloud server 91 may calculate similarity. In this case, the information processing device 92 informs the cloud server 91 of a posture model designated by a user in the same manner as the information processing device 10, and generates target posture data and transmits the data to the cloud server 91 in the same manner as the information processing device 10. The cloud server 91 calculates the similarity based on the posture model designated by the user among posture models obtained by performing a model generation process in the same manner as the information processing device 10 and the target posture data transmitted from the information processing device 92, and transmits the similarity to the information processing device 92. The information processing device 92 causes a screen to be displayed in the same manner as the information processing device 10 based on the similarity transmitted from the cloud server 91.

In addition, also in the information processing system 200, the cloud server 201 may calculate the similarity. In this case, the information processing device 202 informs the cloud server 201 of moving image data to be processed designated by the user in the same manner as the information processing device 100, and generates a posture model and transmits the model to the cloud server 201 in the same manner as the information processing device 100. The cloud server 201 generates target posture data that is posture data of the moving image data to be processed designated by the user in the same manner as the information processing device 100. Then, the cloud server 201 calculates the similarity based on the generated target posture data and the posture model transmitted from the information processing device 202, and transmits the similarity to the information processing device 202. The information processing device 202 causes a screen to be displayed in the same manner as the information processing device 100 based on the similarity transmitted from the cloud server 201.

Furthermore, the present technology can be configured as below.

According to an information processing apparatus embodiment, the embodiment includes
processing circuitry configured to calculate a similarity between a posture model and posture data, wherein
the posture model being indicative of a posture in a time series gesture, and
the posture data being indicative of a posture in a time series of a subject in moving image data.

According to one aspect, the embodiment, further includes
a posture estimation section that extracts feature amounts of the posture of the subject from the moving image data and generates the posture data using the feature amounts.

According to another aspect,
the feature amounts are selected to
be unchanged with camera angle during photographing, or
be unchanged with a size of the subject, or
be unchanged with both camera angle during photographing and size of the subject.

According to another aspect, the embodiment further includes
a display controller that causes an image corresponding to the moving image data to be displayed on a display and causes the posture model and other candidate posture models to be displayed.

According to another aspect, the embodiment further includes
a display controller that displays a similarity when a number of moving image data pieces to be processed is one, and displays an image corresponding to selected moving image data and corresponding similarity to be displayed after selecting moving image data with a highest similarity.

According to another aspect, the embodiment further includes
a display controller that causes the similarity to be displayed.

According to another aspect, the embodiment further includes
a display controller that causes a selection field to be displayed that includes a plurality of candidate posture models for user selection.

According to another aspect, the embodiment further includes
a display controller that causes an image data to be processed for determining similarity with respect to the posture model, wherein the image data being at least one of a still image, a moving image and a thumbnail image.

According to another aspect, the embodiment further includes a display controller that causes the posture data to be displayed as an image group of a plurality of moving image data pieces to be processed for determining similarity with respect to the posture model.

According to another aspect, the processing circuitry includes a cloud server and an information processing device, the cloud server provides the posture model to the information processing device in response to a request from the information processing device.

According to another aspect, the information processing device calculates the similarity between the posture model and the posture data.

According to another aspect, the embodiment further includes a display controller that displays user-selected moving image data in order of highest similarity.

According to another aspect, the user-selected moving image data is selectable within a predetermined range.

According to another aspect, the embodiment further includes a search key acquisition section that searches moving image data based on an input search key.

According to another aspect, the search key being a file of moving image data of a gesture, and the search key acquisition section identifies moving image data for other subjects making a similar gesture.

According to another aspect, the processing circuitry includes a cloud server and an information processing device, in response to a request from the information processing device, the cloud server calculates the similarity based on target posture data and the posture model.

According to another aspect, the information processing device includes in the request the posture model designated by a user and generates the target posture data.

According to another aspect, the cloud server provides the similarity to the information processing device as a response to the request.

According to a method embodiment, the method includes calculating with processing circuitry a similarity between a posture model and posture data, wherein the posture model being indicative of a posture in a time series gesture, and the posture data being indicative of a posture in a time series of a subject in moving image data.

According to a non-transitory computer readable medium embodiment, the medium includes instructions stored therein that when executed by processing circuitry implements an information processing method, the method includes calculating with processing circuitry a similarity between a posture model and posture data, wherein the posture model being indicative of a posture in a time series gesture, and the posture data being indicative of a posture in a time series of a subject in moving image data.

According to one embodiment, an information processing device includes a similarity calculation unit that calculates the similarity between a posture model indicating a posture in a time series in a gesture that serves as a model and target posture data that is posture data indicating a posture in a time series of a subject in moving image data based on the posture model and the target posture data, and a display control unit that causes a screen to be displayed on a display unit based on the similarity calculated by the similarity calculation unit.

According to one aspect, the display control unit causes the screen containing an image corresponding to the similarity and the moving image data to be displayed on the display unit.

According to another aspect, the similarity calculation unit calculates the similarity for each piece of the moving image data based on the posture model and the target posture data of a plurality of the moving image data pieces, and the display control unit causes the screen containing an image based on moving image data corresponding to the highest similarity among the similarities of the plurality of moving image data pieces to be displayed on the display unit.

According to another aspect, the similarity calculation unit calculates the similarity for each piece of the moving image data based on the posture model and the target posture data of a plurality of the moving image data pieces, and the display control unit causes the screen containing an image corresponding to moving image data of which the similarity is within a predetermined range to be displayed on the display unit.

According to another aspect, the embodiment further includes a model generation unit that generates the posture model from moving image data of the subject making the gesture that serves as a model, and in which the similarity calculation unit calculates the similarity based on the posture model generated by the model generation unit and the target posture data.

According to another aspect, the model generation unit generates the posture model by modeling a posture in a time series in the gesture that serves as a model using the posture data of the plurality of moving image data of the subject making the gesture that serves as a model.

According to another aspect, the model generation unit generates the posture model by vectorizing posture data of at least one piece of moving image data of the subject making the gesture that serves as a model, and by optimizing the vector of the posture data obtained from the result.

According to another aspect, the embodiment further includes a posture estimation unit that generates the target posture data from the moving image data, and in which the similarity calculation unit calculates the similarity based on the posture model and the target posture data generated by the posture estimation unit.

According to a method embodiment, a method of an information processing device includes a similarity calculation step of calculating the similarity between a posture model indicating a posture in a time series in a gesture that serves as a model and target posture data that is posture data indicating a posture in a time series of a subject in moving image data based on the posture model and the target posture data, and a display control step of causing a screen to be displayed on a display unit based on the similarity calculated in the process of the similarity calculation step.

According to one embodiment, an information processing system includes a first information processing device having, a model generation unit that generates, from moving image data of a subject making a gesture that serves as a model, a posture model indicating a posture in a time series in the gesture, a transmission unit that transmits the posture model, a second information processing device having, a reception unit that receives the posture model transmitted from the transmission unit, a posture estimation unit that generates posture data indicating a posture in a time series of a subject from moving image data as target posture data, a similarity calculation unit that calculates the similarity between the posture model and the target posture data based on the posture model received by the reception unit and the target posture data generated by the posture estimation unit, and a display control unit that causes a screen to be displayed on a display unit based on the similarity calculated by the similarity calculation unit.

According to one embodiment, an information processing system includes a first information processing device having a posture estimation unit that generates posture data indicating a posture in a time series of a subject from moving image data as target posture data, a transmission unit that transmits the target posture data generated by the posture estimation unit, a second information processing device having a reception unit that receives the target posture data transmitted from the transmission unit, a model generation unit that generates, from moving image data of a subject making a gesture that serves as a model, a posture model indicating a posture in a time series in the gesture, a similarity calculation unit that calculates the similarity between the posture model and the target posture data based on the target posture data received by the reception unit and the posture model generated by the model generation unit, and a display control unit that causes a screen to be displayed on a display unit based on the similarity calculated by the similarity calculation unit.

According to one embodiment, an information processing system includes a first information processing device having a model generation unit that generates, from moving image data of a subject making a gesture that serves as a model, a posture model indicating a posture in a time series in the gesture, a posture reception unit that receives posture data indicating a posture in a time series of a subject generated from moving image data as target posture data, a similarity calculation unit that calculates the similarity between the posture model and the target posture data based on the posture model generated by the model generation unit and the target posture data received by the posture reception unit, and a similarity transmission unit that transmits the similarity calculated by the similarity calculation unit, and a second information processing device having a posture estimation unit that generates the target posture data from the moving image data, a posture transmission unit that transmits the target posture data generated by the posture estimation unit, a similarity reception unit that receives the similarity transmitted from the similarity transmission unit, and a display control unit that causes a screen to be displayed on a display unit based on the similarity received by the similarity reception unit.

According to one embodiment, an information processing system includes a first information processing device having a posture estimation unit that generates posture data indicating a posture in a time series of a subject from moving image data as target posture data, a model reception unit that receives a posture model that is generated from moving image data of a subject making a gesture that serves as a model and indicates a posture in a time series in the gesture, a similarity calculation unit that calculates the similarity between the posture model and the target posture data based on the target posture data generated by the posture estimation unit and the posture model generated by the model reception unit, and a similarity transmission unit that transmits the similarity calculated by the similarity calculation unit, and a second information processing device having a model generation unit that generates the posture model from the moving image data of the subject making the gesture that serves as a model, a model transmission unit that transmits the posture model generated by the model generation unit, a similarity reception unit that receives the similarity transmitted from the similarity transmission unit, and a display control unit that causes a screen to be displayed on a display unit based on the similarity received by the similarity reception unit.

REFERENCE SIGNS LIST

10 INFORMATION PROCESSING DEVICE
11 CPU
43 MODEL GENERATION UNIT
63 POSTURE ESTIMATION UNIT
64 SIMILARITY CALCULATION UNIT
65 DISPLAY CONTROL UNIT
90 INFORMATION PROCESSING SYSTEM
91 CLOUD SERVER
92 INFORMATION PROCESSING DEVICE
100 INFORMATION PROCESSING DEVICE
101 CPU
122 MODEL GENERATION UNIT
123 SIMILARITY CALCULATION UNIT
124 DISPLAY CONTROL UNIT
200 INFORMATION PROCESSING SYSTEM
201 CLOUD SERVER
202 INFORMATION PROCESSING DEVICE

The invention claimed is:

1. An information processing apparatus, comprising: processing circuitry configured to:

calculate a value of similarity between a posture model and posture data, wherein the posture model is indicative of a posture in a time series gesture, and wherein the posture data is indicative of a posture in a time series of a first subject in moving image data; and a display controller configured to:

display a plurality of images, from the moving image data, that have the value of similarity within a determined range;

display the calculated value of similarity based on a number of moving image data pieces to be processed being one; and display first moving image data of the moving image data pieces and a corresponding value of similarity based on a selection of the first moving image data with a highest value of similarity.

2. The information processing apparatus of claim 1, wherein the processing circuitry is further configured to extract feature amounts of the posture of the first subject from the moving image data to generate the posture data.

3. The information processing apparatus of claim 2, wherein the feature amounts are selected to
be unchanged with camera angle during photographying, or
be unchanged with a size of the first subject, or
be unchanged with both the camera angle during the photographying and the size of the first subject.

4. The information processing apparatus of claim 1, wherein the display controller is further configured to display the moving image data on a display and display the posture model and a plurality of candidate posture models.

5. The information processing apparatus of claim 1, wherein the display controller is further configured to display a selection field that includes a plurality of candidate posture models for user selection.

6. The information processing apparatus of claim 1, wherein the display controller is further configured to process the moving image data to determine the value of similarity with respect to the posture model, wherein the moving image data is at least one of a still image, a moving image, or a thumbnail image.

7. The information processing apparatus of claim 1, wherein the display controller is further configured to display the posture data as an image group of the moving image data pieces to be processed to determine the value of similarity with respect to the posture model.

8. The information processing apparatus of claim 1, wherein the processing circuitry includes a cloud server and an information processing device, wherein the cloud server is configured to provide the posture model to the information processing device based on a request from the information processing device.

9. The information processing apparatus of claim 8, wherein the information processing device is further configured to calculate the value of similarity between the posture model and the posture data.

10. The information processing apparatus of claim 1, wherein the display controller is further configured to display the plurality of images in order of highest value of similarity.

11. The information processing apparatus of claim 1, further comprising:
a search key acquisition section configured to search the moving image data based on an input search key.

12. The information processing apparatus of claim 11, wherein the search key is a file of the moving image data of a gesture, and the search key acquisition section is further configured to identify another moving image data for a second subject that makes a similar gesture.

13. The information processing apparatus of claim 1, wherein the processing circuitry includes a cloud server and an information processing device, wherein based on a request from the information processing device, the cloud server is configured to calculate the value of similarity based on target posture data and the posture model.

14. The information processing apparatus of claim 13, wherein the information processing device is configured to include in the request the posture model designated by a user and generate the target posture data.

15. The information processing apparatus of claim 14, wherein the cloud server is further configured to provide the value of similarity to the information processing device as a response to the request.

16. An information processing method, comprising:
calculating, with processing circuitry, a value of similarity between a posture model and posture data,
wherein the posture model is indicative of a posture in a time series gesture, and
wherein the posture data is indicative of a posture in a time series of a subject in moving image data;
displaying, with a display controller, a plurality of images, from the moving image data, that have the value of similarity within a determined range;
displaying, with the display controller, the calculated value of similarity based on a number of moving image data pieces to be processed being one; and
displaying, with the display controller, first moving image data of the moving image data pieces and a corresponding value of similarity based on a selection of the first moving image data with a highest value of similarity.

17. A non-transitory computer-readable storage medium having stored thereon computer-executable instructions for causing a computer to execute operations, the operations comprising:
calculating, with processing circuitry, a value of similarity between a posture model and posture data,
wherein the posture model is indicative of a posture in a time series gesture, and
wherein the posture data is indicative of a posture in a time series of a subject in moving image data;
displaying, with a display controller, a plurality of images, from the moving image data, that have the value of similarity within a determined range;
displaying, with the display controller, the calculated value of similarity based on a number of moving image data pieces to be processed being one; and
displaying, with the display controller, first moving image data and a corresponding value of similarity based on a selection of the first moving image data with a highest value of similarity.

* * * * *